US012580748B2

(12) United States Patent
Zhang et al.

(10) Patent No.: US 12,580,748 B2
(45) Date of Patent: Mar. 17, 2026

(54) METHOD OF ENCRYPTION AND DECRYPTION INITIALIZATION CONFIGURATION, EDGE PORT, ENCRYPTION AND DECRYPTION PLATFORM AND SECURITY SYSTEM

(71) Applicant: BOE Technology Group Co., Ltd., Beijing (CN)

(72) Inventors: Shuguo Zhang, Beijing (CN); Youxiang Xia, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 224 days.

(21) Appl. No.: 18/272,218

(22) PCT Filed: Sep. 21, 2022

(86) PCT No.: PCT/CN2022/120281
§ 371 (c)(1),
(2) Date: Jul. 13, 2023

(87) PCT Pub. No.: WO2023/109235
PCT Pub. Date: Jun. 22, 2023

(65) Prior Publication Data
US 2024/0146514 A1 May 2, 2024

(30) Foreign Application Priority Data
Dec. 17, 2021 (CN) .......................... 202111561377.0

(51) Int. Cl.
*H04L 9/08* (2006.01)
*H04L 9/14* (2006.01)
(52) U.S. Cl.
CPC .............. *H04L 9/0838* (2013.01); *H04L 9/14* (2013.01)

(58) Field of Classification Search
CPC ....... H04L 9/0838; H04L 9/14; H04L 9/0637; H04L 9/0825; H04L 9/302; G06F 21/602; G06F 21/62
See application file for complete search history.

(56) References Cited

U.S. PATENT DOCUMENTS 4,658,094 A * 4/1987 Clark ...................... H04L 9/302
380/28
8,782,774 B1 * 7/2014 Pahl ...................... H04L 9/0841
726/4
(Continued)

FOREIGN PATENT DOCUMENTS

CN 103440209 A * 12/2013 ............. G06F 12/14
CN 106375306 A 2/2017
(Continued)

OTHER PUBLICATIONS

Office Action dated Apr. 28, 2024, issued in counterpart CN Application No. 202111561377.0, with English translation. (22 pages).

*Primary Examiner* — Lynn D Feild
*Assistant Examiner* — Abdullah Almamun
(74) *Attorney, Agent, or Firm* — WHDA, LLP

(57) ABSTRACT

The present disclosure provides a method of encryption and decryption initialization configuration, an edge port, an encryption and decryption platform and a security system, relating to the technical field of data processing. The method includes: generating, by an edge port, a public key and a private key of an asymmetric encryption and decryption algorithm, and transmitting the public key to an encryption and decryption platform; encrypting, by the edge port, key-related data of the symmetric encryption and decryption algorithm required by the encryption and decryption platform via the private key of the asymmetric encryption and decryption algorithm, and transmitting same to the encryp-
(Continued)

tion and decryption platform; and decrypting to obtain, by the encryption and decryption platform, the key-related data according to the public key of the asymmetric encryption and decryption algorithm, and completing initialization configuration.

17 Claims, 9 Drawing Sheets

(56)                    References Cited

U.S. PATENT DOCUMENTS

| | | | | |
|---|---|---|---|---|
| 10,044,509 | B1 * | 8/2018 | Kirshner | H04L 63/045 |
| 10,432,406 | B1 * | 10/2019 | Amdahl | H04L 63/205 |
| 2004/0096057 | A1 * | 5/2004 | Moore | G06F 7/722 |
| | | | | 380/28 |
| 2009/0055695 | A1 * | 2/2009 | Maddali | G01R 31/3187 |
| | | | | 714/724 |
| 2010/0316215 | A1 * | 12/2010 | Bergsten | H04L 9/0841 |
| | | | | 380/29 |
| 2016/0004511 | A1 * | 1/2016 | Lu | G06F 7/72 |
| | | | | 708/491 |
| 2019/0394178 | A1 * | 12/2019 | Won | H04L 63/0823 |
| 2022/0321331 | A1 * | 10/2022 | Kisley | H04L 9/3066 |

FOREIGN PATENT DOCUMENTS

| | | | |
|---|---|---|---|
| CN | 108900307 A | 11/2018 | |
| CN | 110602107 A | 12/2019 | |
| CN | 113422683 A | 9/2021 | |
| CN | 114218594 A | 3/2022 | |
| WO | 2021/208690 A1 | 10/2021 | |

* cited by examiner

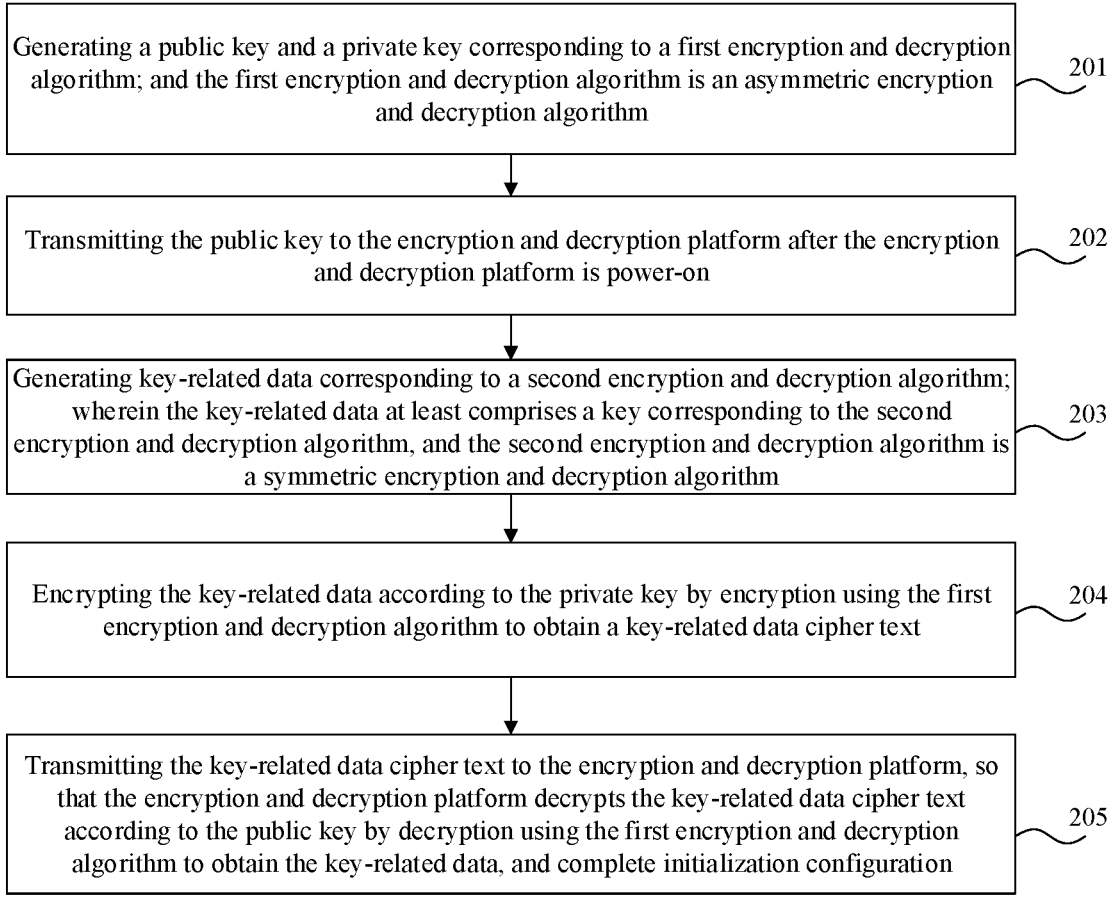

Generating a public key and a private key corresponding to a first encryption and decryption algorithm; and the first encryption and decryption algorithm is an asymmetric encryption and decryption algorithm — 201

Transmitting the public key to the encryption and decryption platform after the encryption and decryption platform is power-on — 202

Generating key-related data corresponding to a second encryption and decryption algorithm; wherein the key-related data at least comprises a key corresponding to the second encryption and decryption algorithm, and the second encryption and decryption algorithm is a symmetric encryption and decryption algorithm — 203

Encrypting the key-related data according to the private key by encryption using the first encryption and decryption algorithm to obtain a key-related data cipher text — 204

Transmitting the key-related data cipher text to the encryption and decryption platform, so that the encryption and decryption platform decrypts the key-related data cipher text according to the public key by decryption using the first encryption and decryption algorithm to obtain the key-related data, and complete initialization configuration — 205

FIG. 4

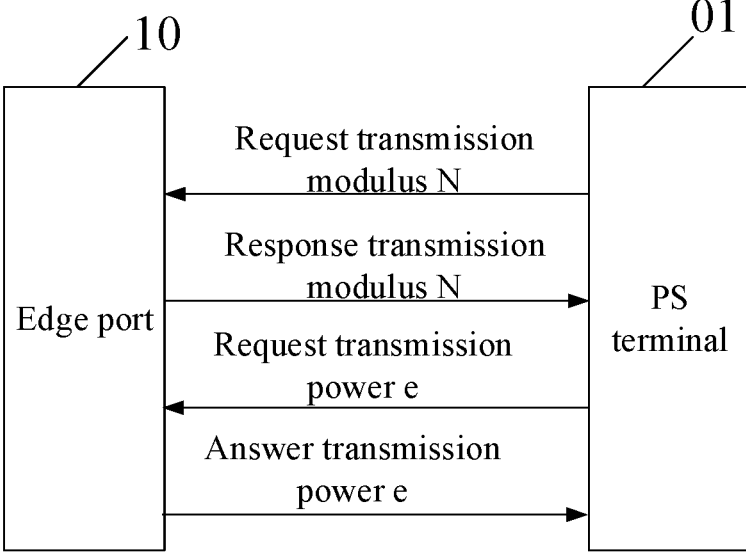

10

01

Edge port

Request transmission modulus N

Response transmission modulus N

Request transmission power e

Answer transmission power e

PS terminal

FIG. 5

Figure 11:
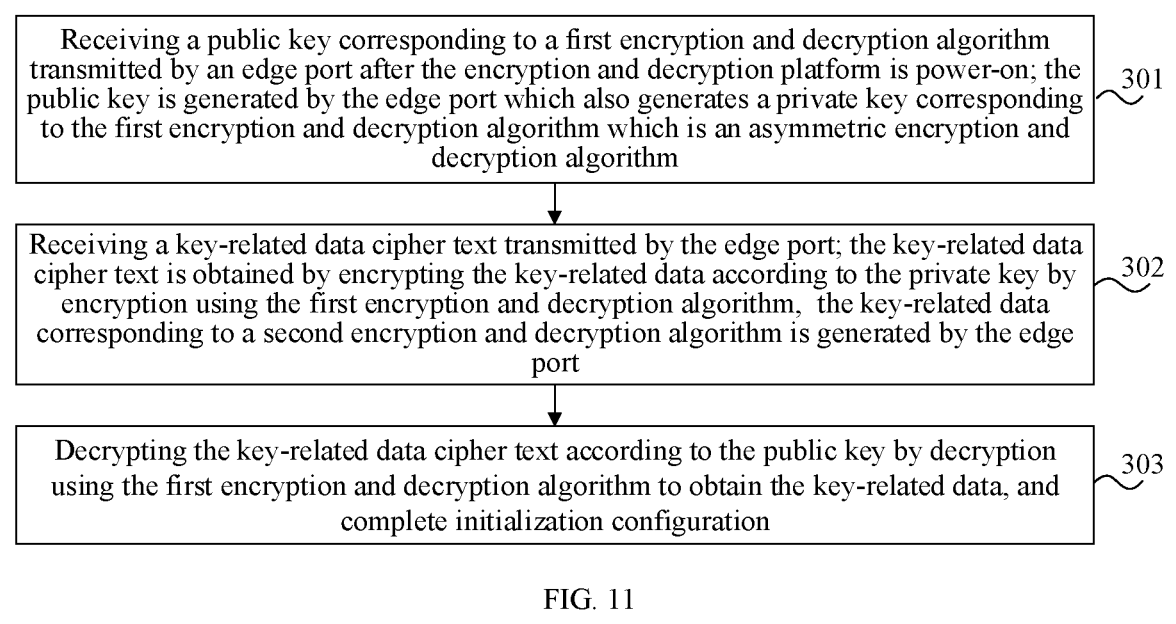

Receiving a public key corresponding to a first encryption and decryption algorithm transmitted by an edge port after the encryption and decryption platform is power-on; the public key is generated by the edge port which also generates a private key corresponding to the first encryption and decryption algorithm which is an asymmetric encryption and decryption algorithm

301

Receiving a key-related data cipher text transmitted by the edge port; the key-related data cipher text is obtained by encrypting the key-related data according to the private key by encryption using the first encryption and decryption algorithm, the key-related data corresponding to a second encryption and decryption algorithm is generated by the edge port

302

Decrypting the key-related data cipher text according to the public key by decryption using the first encryption and decryption algorithm to obtain the key-related data, and complete initialization configuration

METHOD OF ENCRYPTION AND DECRYPTION INITIALIZATION CONFIGURATION, EDGE PORT, ENCRYPTION AND DECRYPTION PLATFORM AND SECURITY SYSTEM

The present disclosure claims priority of the Chinese patent application filed on Dec. 17, 2021 before the China National Intellectual Property Administration with the application number of 202111561377.0, and the title of "Encryption and Decryption Initialization Configuration Method, Edge End, Encryption and Decryption Platform and Security System", which is incorporated herein in its entirety by reference.

TECHNICAL FIELD

The present disclosure relates to the technical field of data processing, in particular to a method of encryption and decryption initialization configuration, an edge port, an encryption and decryption platform and a security system.

BACKGROUND

With the continuous development of information technology, the problem of information security is paid more and more attention, and the core of information security is cryptographic technology. In practice, in order to save processing resources of some device nodes, a key required for encryption and decryption can be generated by an edge port, and the key used for performing encryption and decryption each time after the device node is power-on is different. Therefore, after the device node is power-on, the edge port needs to reload the key required this time to the device node.

SUMMARY

In a first aspect, the present disclosure provides a method of encryption and decryption initialization configuration, wherein the method is applied to an edge port in a security system, the security system further comprises an encryption and decryption platform, the edge port is communication connected to the encryption and decryption platform, and the method comprises:

generating a public key and a private key corresponding to a first encryption and decryption algorithm, wherein the first encryption and decryption algorithm is an asymmetric encryption and decryption algorithm;

transmitting the public key to the encryption and decryption platform after the encryption and decryption platform is power-on;

generating key-related data corresponding to a second encryption and decryption algorithm, wherein the key-related data at least comprises a key corresponding to the second encryption and decryption algorithm, and the second encryption and decryption algorithm is a symmetric encryption and decryption algorithm;

encrypting the key-related data according to the private key by encryption using the first encryption and decryption algorithm, to obtain a key-related data cipher text; and transmitting the key-related data cipher text to the encryption and decryption platform, so that the encryption and decryption platform decrypts the key-related data cipher text according to the public key by decryption using the first encryption and decryption algorithm to obtain the key-related data, and complete initialization configuration.

Optionally, communication between the edge port and the encryption and decryption platform is performed in a request-response manner based on a custom communication protocol.

Optionally, the public key comprises a modulus and a power, and the transmitting the public key to the encryption and decryption platform after the encryption and decryption platform is power-on comprises:

transmitting the modulus to the encryption and decryption platform when a modulus transmission request transmitted by the encryption and decryption platform is received, wherein the modulus transmission request is transmitted after the encryption and decryption platform is power-on; and transmitting the power to the encryption and decryption platform when a power transmission request transmitted by the encryption and decryption platform is received, wherein the modulus transmission request is transmitted after the encryption and decryption platform is power-on.

Optionally, the key-related data further comprises initial parameters required for encryption and decryption by the key, and the key-related data cipher text comprises a key cipher text corresponding to the key and an initial parameter cipher text corresponding to the initial parameters;

the transmitting the key-related data cipher text to the encryption and decryption platform comprises:

transmitting the key cipher text to the encryption and decryption platform when a key cipher text transmission request transmitted by the encryption and decryption platform is received; and transmitting the initial parameter cipher text to the encryption and decryption platform when an initial parameter cipher text transmission request transmitted by the encryption and decryption platform is received.

In a second aspect, the present disclosure provides a method of encryption and decryption initialization configuration, wherein the method is applied to an encryption and decryption platform in a security system, the security system further comprises an edge port communication connected to the encryption and decryption platform, and the method comprises: receiving a public key corresponding to a first encryption and decryption algorithm transmitted by the edge port after the encryption and decryption platform is power-on; wherein the public key is generated by the edge port, and the edge port further generates a private key corresponding to the first encryption and decryption algorithm which is an asymmetric encryption and decryption algorithm;

receiving a key-related data cipher text transmitted by the edge port; wherein the key cipher text is obtained by encrypting the key-related data according to the private key by encryption using the first encryption and decryption algorithm, and the key-related data corresponding to a second encryption and decryption algorithm is generated by the edge port;

decrypting the key-related data cipher text according to the public key by decryption using the first encryption and decryption algorithm, to obtain the key-related data, and complete initialization configuration.

Optionally, the public key comprises a modulus and a power, and the receiving a public key corresponding to a first encryption and decryption algorithm transmitted by the edge port after the encryption and decryption platform is power-on comprises:

transmitting a modulus transmission request to the edge port after the encryption and decryption platform is power-on;

receiving the modulus transmitted by the edge port;

transmitting a power transmission request to the edge port after the encryption and decryption platform is power-on; and receiving the power transmitted by the edge port.

Optionally, the key-related data further comprises initial parameters required for encryption and decryption by the key, and the key-related data cipher text comprises a key cipher text corresponding to the key and an initial parameter cipher text corresponding to the initial parameters;

the receiving a key-related data cipher text transmitted by the edge port comprises:

transmitting a key cipher text transmission request to the edge port;

receiving the key cipher text transmitted by the edge port;

transmitting an initial parameter cipher text transmission request to the edge port after the encryption and decryption platform is power-on;

receiving the initial parameter cipher text transmitted by the edge port.

Optionally, the encryption and decryption platform comprises a processor system and a programmable logic device;

the receiving the modulus transmitted by the edge port comprises:

receiving, by the processor system, the modulus transmitted by the edge port;

the receiving the power transmitted by the edge port comprises:

receiving, by the processor system, the power transmitted by the edge port;

after the receiving a public key corresponding to a first encryption and decryption algorithm transmitted by the edge port after the encryption and decryption platform is power-on, the method further comprises:

calculating and obtaining, by a processor system, target parameters required to perform encryption and decryption via the public key according to the modulus;

transmitting, by the processor system, the modulus, the power, and the target parameters to the programmable logic device for storage.

Optionally, the transmitting, by the processor system, the modulus, the power, and the target parameters to the programmable logic device for storage comprises:

writing, by the processor system, a data type of the modulus into a configuration register of the programmable logic device;

transmitting, by the processor system, the modulus to the programmable logic device;

storing, by the programmable logic device, the modulus in a first storage area according to the data type of the modulus in the configuration register;

writing, by the processor system, a data type of the power into the configuration register of the programmable logic device;

transmitting, by the processor system, the power to the programmable logic device;

storing, by the programmable logic device, the power in a second storage area according to the data type of the power in the configuration register.

Optionally, a quantity of the target parameters is at least one, the transmitting, by the processor system, the modulus, power, and target parameters to the programmable logic device for storage further comprises:

performing following operations for each target parameter in turn:

writing, by the processor system, a data type of the target parameter to the configuration register of the programmable logic device;

transmitting, by the processor system, the target parameter to the programmable logic device;

storing, by the programmable logic device, the target parameter in a third storage area according to the data type of the target parameter in the configuration register;

wherein the data types of the target parameters are different, and the third storage areas corresponding to the target parameters are different.

Optionally, the encryption and decryption platform comprises a processor system and a programmable logic device;

the receiving the key cipher text transmitted by the edge port comprises:

receiving, by the processor system, the key cipher text transmitted by the edge port;

the decrypting the key-related data cipher text according to the public key by decryption using the first encryption and decryption algorithm to obtain the key-related data, and complete initialization configuration comprises:

writing, by the processor system, a decryption instruction of the key cipher text into a configuration register of the programmable logic device;

transmitting, by the processor system, the key cipher text to the programmable logic device;

executing, by the programmable logic device, a step of decrypting the key cipher text according to the public key by decryption using the first encryption and decryption algorithm according to the decryption instruction of the key cipher text in the configuration register, to obtain the key;

transmitting, by the programmable logic device, the key to the processor system;

writing, by the processor system, a data type of the key into the configuration register of the programmable logic device;

transmitting, by the processor system, the key to the programmable logic device; and storing, by the programmable logic device, the key in a fourth storage area according to the data type of the key in the configuration register.

Optionally, the receiving the initial parameter cipher text transmitted by the edge port comprises:

receiving, by the processor system, the initial parameter cipher text transmitted by the edge port;

the decrypting the key-related data cipher text according to the public key by decryption using the first encryption and decryption algorithm to obtain the key-related data, and complete initialization configuration further comprises:

writing, by the processor system, a decryption instruction of the initial parameter cipher text into the configuration register of the programmable logic device;

transmitting, by the processor system, the initial parameter cipher text to the programmable logic device;

executing, by the programmable logic device, a step of decrypting the initial parameter cipher text according to the public key by decryption using the first encryption and decryption algorithm according to the decryption instruction of the initial parameter cipher text in the configuration register, to obtain the initial parameter;

transmitting, by the programmable logic device, the initial parameter to the processor system;

writing, by the processor system, a data type of the initial parameter to the configuration register of the programmable logic device;

transmitting, by the processor system, the initial parameter to the programmable logic device; and storing, by the programmable logic device, the initial parameter in a fifth storage area according to the data type of the initial parameter in the configuration register.

In a third aspect, the present disclosure also provides a method of encryption and decryption initialization configuration, wherein the method is applied to a security system, the security system comprises an edge port and an encryption and decryption platform, the edge port is communication connected to the encryption and decryption platform, and the method comprises:

generating, by the edge port, a public key and a private key corresponding to a first encryption and decryption algorithm, wherein the first encryption and decryption algorithm is an asymmetric encryption and decryption algorithm;

transmitting, by the edge port, the public key to the encryption and decryption platform after the encryption and decryption platform is power-on;

receiving, by the encryption and decryption platform, the public key transmitted by the edge port after the encryption and decryption platform is power-on;

generating, by the edge port, key-related data corresponding to a second encryption and decryption algorithm, wherein the key-related data at least comprises a key corresponding to the second encryption and decryption algorithm, and the second encryption and decryption algorithm is a symmetric encryption and decryption algorithm;

encrypting, by the edge port, the key-related data according to the private key by encryption using the first encryption and decryption algorithm to obtain a key-related data cipher text; and transmitting, by the edge port, the key-related data cipher text to the encryption and decryption platform;

receiving, by the encryption and decryption platform, the key-related data cipher text transmitted by the edge port; and decrypting, by the encryption and decryption platform, the key-related data cipher text according to the public key by decryption using the first encryption and decryption algorithm to obtain the key-related data, and complete initialization configuration.

In a fourth aspect, the present disclosure also provides an edge port, wherein the edge port belongs to a security system, the security system further comprises an encryption and decryption platform, the edge port is communication connected to the encryption and decryption platform, and the edge port comprises:

a first generation module configured to generate a public key and a private key corresponding to a first encryption and decryption algorithm, wherein the first encryption and decryption algorithm is an asymmetric encryption and decryption algorithm;

a first transmitting module configured to transmit the public key to the encryption and decryption platform after the encryption and decryption platform is power-on;

a second generation module configured to generate key-related data corresponding to a second encryption and decryption algorithm, wherein the key-related data at least comprises a key corresponding to the second encryption and decryption algorithm, and the second encryption and decryption algorithm is a symmetric encryption and decryption algorithm;

an encryption module configured to encrypt the key-related data according to the private key by encryption using the first encryption and decryption algorithm to obtain a key-related data cipher text; and a second transmission module configured to transmit the key-related data cipher text to the encryption and decryption platform, so that the encryption and decryption platform decrypts the key-related data cipher text according to the public key by decryption using the first encryption and decryption algorithm to obtain the key-related data, and complete initialization configuration.

In a fifth aspect, the present disclosure also provides an encryption and decryption platform, wherein the encryption and decryption platform belongs to a security system, the security system further comprises an edge port, the edge port is communication connected to the encryption and decryption platform, and the encryption and decryption platform comprises:

a first receiving module configured to receive a public key corresponding to a first encryption and decryption algorithm transmitted by the edge port after the encryption and decryption platform is power-on, wherein the public key is generated by the edge port, the edge port further generates a private key corresponding to the first encryption and decryption algorithm, and the first encryption and decryption algorithm is an asymmetric encryption and decryption algorithm;

a second receiving module configured to receive a key-related data cipher text transmitted by the edge port, wherein the key cipher text is obtained by encrypting the key-related data according to the private key by encryption using the first encryption and decryption algorithm, and the key-related data corresponding to a second encryption and decryption algorithm is generated by the edge port; and a decryption module configured to decrypt the key-related data cipher text according to the public key by decryption using the first encryption and decryption algorithm to obtain the key-related data, and complete initialization configuration.

In a sixth aspect, the present disclosure also provides a security system, wherein the security system comprises an edge port and an encryption and decryption platform, the edge port and the encryption and decryption platform are communication connected;

the edge port is configured to generate a public key and a private key corresponding to a first encryption and decryption algorithm, wherein the first encryption and decryption algorithm is an asymmetric encryption and decryption algorithm;

the edge port is further configured to transmit the public key to the encryption and decryption platform after the encryption and decryption platform is power-on;

the encryption and decryption platform is configured to receive the public key transmitted by the edge port after the encryption and decryption platform is power-on;

the edge port is further configured to generate key-related data corresponding to a second encryption and decryption algorithm, wherein the key-related data at least comprises a key corresponding to the second encryption and decryption algorithm, and the second encryp-
tion and decryption algorithm is a symmetric encryp-
tion and decryption algorithm;

the edge port is further configured to encrypt the key-
related data according to the private key by encryption
using the first encryption and decryption algorithm to
obtain a key-related data cipher text;

the edge port is further configured to transmit the key-
related data cipher text to the encryption and decryption
platform;

the encryption and decryption platform is further config-
ured to receive the key-related data cipher text trans-
mitted by the edge port;

the encryption and decryption platform is further config-
ured to decrypt the key-related data cipher text accord-
ing to the public key by decryption using the first
encryption and decryption algorithm to obtain the key-
related data, and complete initialization configuration.

In a seventh aspect, the present disclosure also provides
an edge port, wherein the edge port comprises a processor,
a memory and a program stored on the memory and execut-
able on the processor, when the program is executed, causes
the processor to implement the steps of the method of
encryption and decryption initialization configuration
according to the first aspect.

In an eighth aspect, the present disclosure also provides an
encryption and decryption platform, wherein the encryption
and decryption platform comprises a processor system, a
programmable logic device and a program stored on a
memory and executable on the processor system and the
programmable logic device, when the program is executed,
causes the processor system and the programmable logic
device to implement the steps of the method of encryption
and decryption initialization configuration according to the
second aspect.

Optionally, the processor system and the programmable
logic device are interconnected by an AXI bus.

In a ninth aspect, the present disclosure also provides a
security system, comprising the edge port according to the
seventh aspect and the encryption and decryption platform
according to the eighth aspect.

Optionally, the edge port and the encryption and decryp-
tion platform are interconnected by a USB bus.

The above description is only an overview of the technical
solution of the present disclosure. In order to have a clearer
understanding of the technical means of the present disclo-
sure, it can be implemented in accordance with the content
of the specification. In order to make the above and other
purposes, features, and advantages of the present disclosure
more obvious and understandable, the specific implementa-
tion methods of the present disclosure are hereby listed.

BRIEF DESCRIPTION OF THE DRAWINGS

In order to more clearly illustrate the technical solutions
in the embodiments of the present disclosure or related art,
the following will be a brief introduction to the drawings
required in the embodiment or related art description. Appar-
ently, the drawings described below are some embodiments
of the present disclosure, for those of ordinary skill in the art,
without creative labor, may also obtain other drawings based
on these drawings.

FIG. 4 is a flow chart showing the steps of another method
of encryption and decryption initialization configuration
according to an embodiment of the present disclosure;

FIG. 5 shows a schematic diagram of a transmission
public key according to an embodiment of the present
disclosure;

FIG. 11 shows a flow chart of the steps of yet another
method of encryption and decryption initialization configu-
ration according to an embodiment of the present disclosure;

DETAILED DESCRIPTION OF THE EMBODIMENTS

In order to make the purpose, technical solution and
advantages of the present disclosure embodiments clearer,
the following will be combined with the accompanying
drawings in the embodiments of the present disclosure, the
technical solutions in the embodiments of the present dis-
closure are clearly and completely described. Obviously, the
described embodiments are part of the embodiments of the
present disclosure, not all embodiments. Based on the
embodiments in the present disclosure, all other embodi-
ments obtained by those of ordinary skill in the art without
performing creative labor fall within the scope of the pro-
tection of the present disclosure.

Unless otherwise defined, the technical or scientific terms
used in the present disclosure shall have the usual meaning
understood by persons with general skill in the field to whom
the present disclosure belongs. The terms "first", "second"
and similar terms used in the present disclosure do not
indicate any order, number or importance, but are only used
to distinguish different components. Similarly, words such
as "a/an", "one" or "the" do not imply a quantitative limit,
but rather the existence of at least one. A word such as
"including" or "comprising" means that the element or
object appearing before the word covers the element or
object listed after the word and its equivalents, without
excluding other components or objects. Similar words such
as "connecting" or "connection" are not limited to physical or mechanical connections, but may include electrical connections, whether direct or indirect. Orientation words such as "up", "down", "left", "right" are only used to indicate relative position relationships based on the drawings, and when the absolute position of the object is described changes, the relative position relationship may also change accordingly.

At present, based on the efficiency advantages of the symmetric encryption and decryption algorithm, in many scenarios, the symmetric encryption and decryption algorithm will still be used to encrypt and decrypt data, the encryption process and decryption process of the symmetric encryption and decryption algorithm use the same key. Therefore, if the key is stolen, the encryption and decryption system of the device node will be destroyed, and the transmission data cannot be effectively protected. However, in the process of transmitting the key to the device node by the edge port, the key is very easy to be stolen and the security is low.

Figure 1:
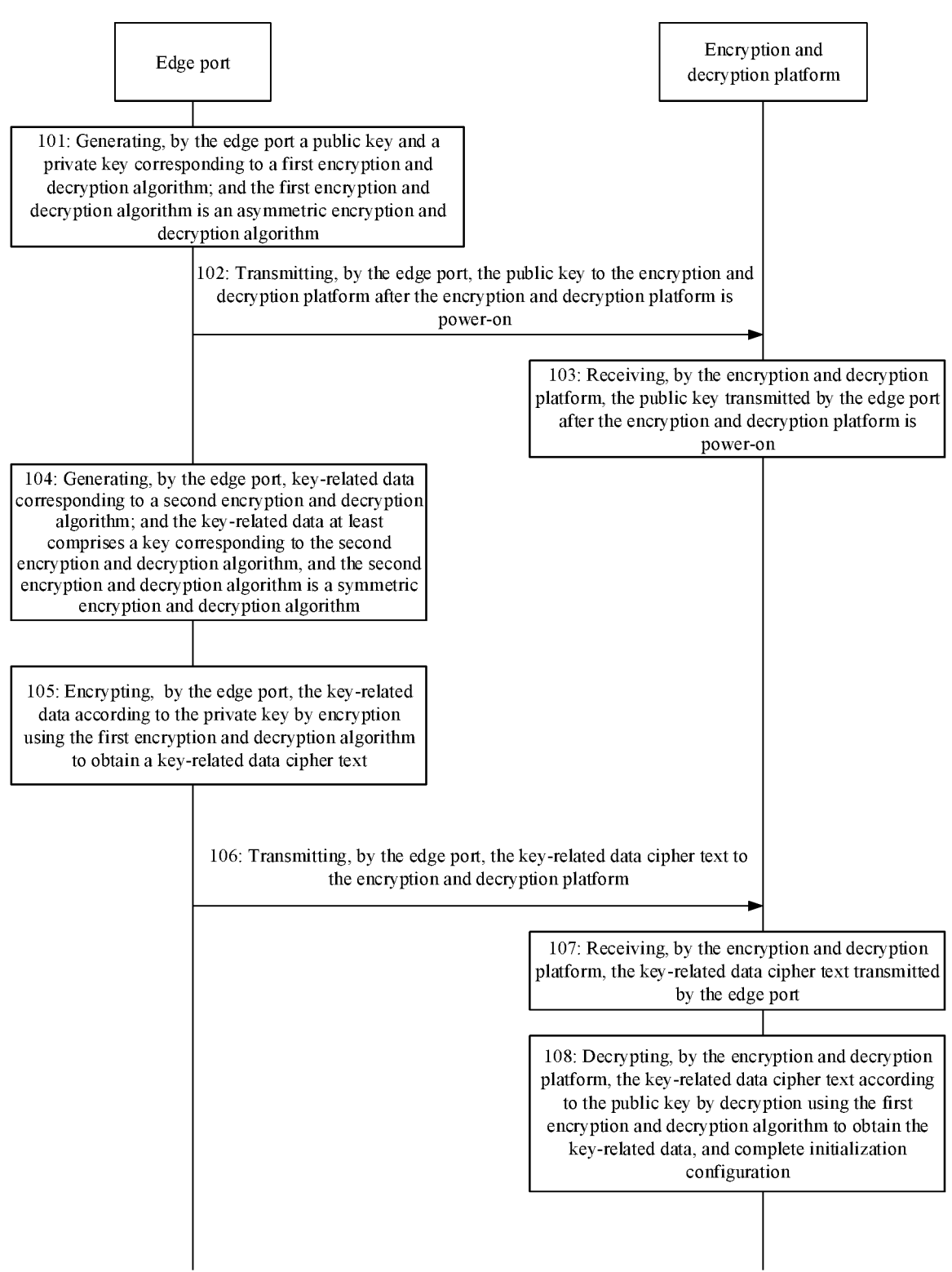
FIG. 1 shows a flow chart of the steps of a method of
encryption and decryption initialization configuration
according to an embodiment of the present disclosure.
Figure 2:
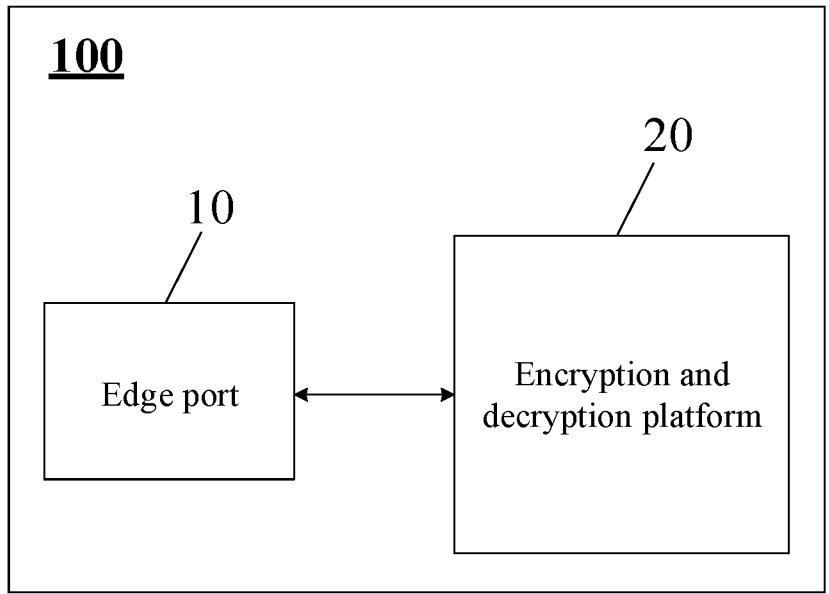
FIG. 2 shows a block diagram of a security system
according to an embodiment of the present disclosure.
Figure 3:
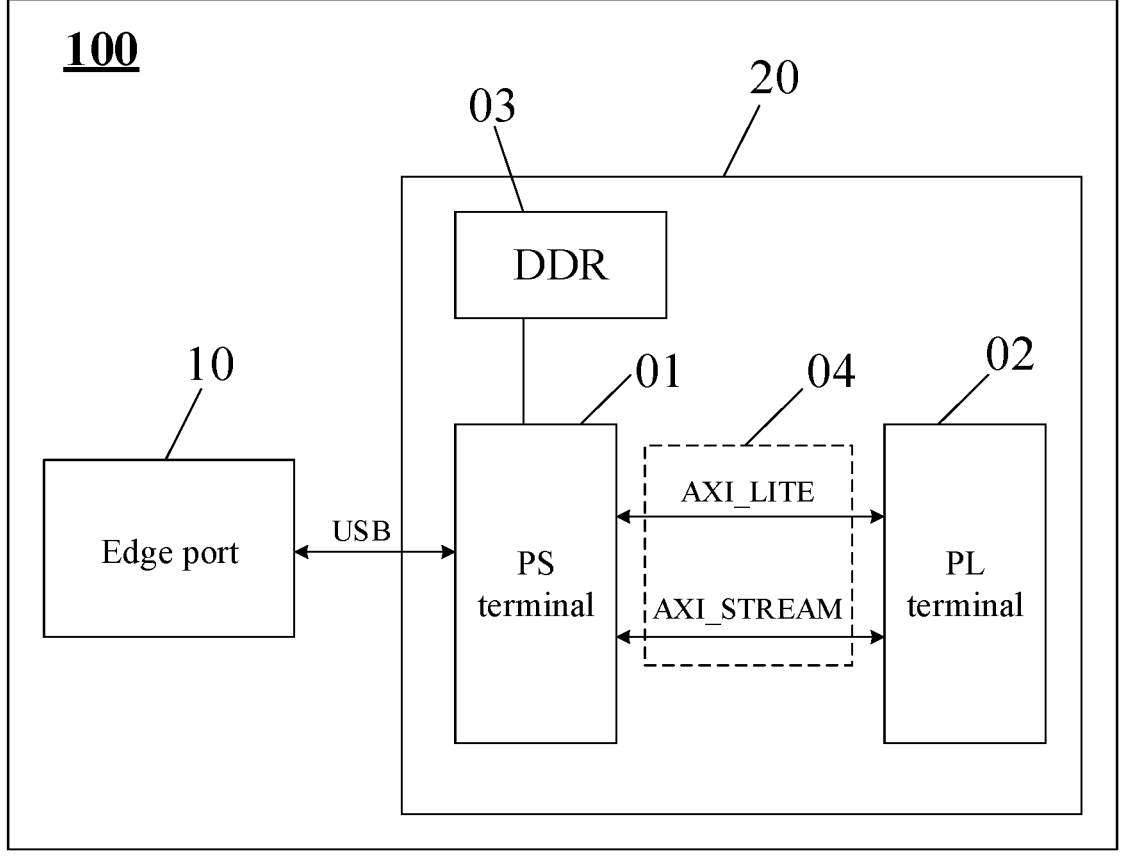
FIG. 3 shows a block diagram of another security system
according to an embodiment of the present disclosure.

Referring to FIG. 1, which shows a flow chart of the steps of a method of encryption and decryption initialization configuration according to an embodiment of the present disclosure, applied to a security system, and referring to FIGS. 2 and 3, a security system 100 includes an edge port 10 and an encryption and decryption platform 20, the edge port 10 is communication connected to the encryption and decryption platform 20.

In alternative embodiments, the security system 100 may be a subsystem in a network system capable of transmitting data for implementing a portion of the processes in network system services.

In some alternative embodiments, the encryption and decryption platform 20 may be used to encrypt and decrypt data to enable secure transmission of the data. In practice, in order to solve the problems of cost and energy, the encryption and decryption platform 20 is not provided with a function kernel for generating keys of an encryption and decryption algorithm. Therefore, the work of generating the keys of the encryption and decryption algorithm can be completed through the edge port 10.

In some alternative embodiments, referring to FIG. 3, the encryption and decryption platform 20 may be a System on Chip (SoC) integrated with a Processing System (PS terminal) 01 and a Programmable Logic (PL terminal) 02. The edge port does not directly interact with the PL terminal, but the edge port directly interacts with the PS terminal, and the PS terminal can interact with the PL terminal. The encryption and decryption platform 20 further comprises a Double Data Rate SDRAM (DDR) 03, and DDR can be used as a data buffer for interaction between the PS terminal and the PL terminal, and are applicable to a data interaction scenario with a large amount of data between the PS terminal and the PL terminal, such as an image processing scenario.

In some alternative embodiments, referring to FIG. 3, a Direct Memory Access (DMA) transmission may be performed between the processor system 01 and the programmable logic device 02. In particular, the processor system 01 and the programmable logic device 02 may be interconnected via an Advanced Extensible Interface (AXI) bus 04 such that the DMA transmission is performed via the AXI bus. Further, in some alternative embodiments, the AXI bus may specifically include an AXI_LITE bus and an AXI_S-TREAM bus, wherein the AXI_LITE bus may be used to transfer small amounts of data, typically write data to configuration registers, and the AXI_STREAM bus may be used to transfer large amounts of data streams.

In some alternative embodiments, the processor system is integrated with a processor, such as an Advanced RISC (Reduced Instruction Set Computing) Machine (ARM) processor, the programmable logic device may be a Field Programmable Gate Array (FPGA).

In some alternative embodiments, referring to FIG. 3, the edge port and the encryption and decryption platform may be interconnected via a Universal Serial Bus (USB). In particular, the edge port and the processor system of the encryption and decryption platform are interconnected via a USB bus.

In particular, the method comprises the steps of:

Step 101: generating, by an edge port, a public key and a private key corresponding to a first encryption and decryption algorithm, and the first encryption and decryption algorithm is an asymmetric encryption and decryption algorithm.

According to an embodiment of the present disclosure, the public key and the key corresponding to the first encryption and decryption algorithm can be generated at the edge port; and since the first encryption and decryption algorithm is an asymmetric encryption and decryption algorithm, the data encrypted by the public key can be decrypted by the private key, and the data encrypted by the private key can be decrypted by the public key.

Alternatively, the first encryption and decryption algorithm may be the RSA (RSA is first letters of the three surnames of the algorithm proposers Ron Rivest, Adi Shamir and Leonard Adleman) algorithm. Certainly, other asymmetric encryption algorithms are also possible, which is not intended to be limited by the embodiment of the present disclosure.

Step 102: transmitting, by the edge port, the public key to the encryption and decryption platform after the encryption and decryption platform is power-on.

After the encryption and decryption platform is power-on, the edge port can transmit the public key corresponding to the first encryption and decryption algorithm to the encryption and decryption platform, and the private key is stored by the edge port. Since the first encryption and decryption algorithm is an asymmetric encryption and decryption algorithm, the public key of the first encryption and decryption algorithm can be transmitted directly in plaintext.

Step 103: receiving, by the encryption and decryption platform, the public key transmitted by the edge port after the encryption and decryption platform is power-on.

After the edge port transmits the public key corresponding to the first encryption and decryption algorithm to the encryption and decryption platform, the encryption and decryption platform can receive the public key transmitted by the edge port.

Step 104: the edge port generates key-related data corresponding to a second encryption and decryption algorithm; wherein the key-related data at least comprises a key corresponding to the second encryption and decryption algorithm, and the second encryption and decryption algorithm is a symmetric encryption and decryption algorithm.

In this step, since the encryption and decryption platform needs to use a new key each time it is power-on, a key corresponding to the second encryption and decryption algorithm can be newly generated at the edge port, and the key will be used as the key for the encryption and decryption work performed after the encryption and decryption platform is power-on this time.

Therein, in some alternative embodiments, the key-related data further comprises initial parameters required for encryption and decryption by the key corresponding to the second encryption and decryption algorithm. In practice, whether and what type of the initial parameters are included in the key-related data depends on the specific encryption and decryption algorithm or the specific encryption mode in the algorithm.

In some alternative embodiments, the initial parameter may be a random number, in particular a true random number generated by a random number generator, or a pseudo random number generated by an algorithm. In some symmetric encryption and decryption algorithms or some encryption modes, the encryption and decryption processes need to be done with the help of the initial parameters.

According to an embodiment of the present disclosure, the encryption and decryption platform requires the use of a symmetric encryption and decryption algorithm for the encryption and decryption work.

Alternatively, the second encryption and decryption algorithm may be the Advanced Encryption Standard (AES) algorithm. Certainly, other symmetric encryption algorithms are possible, which is not intended to be limited by the embodiment of the present disclosure.

Step 105: encrypting the key-related data according to the private key by encryption using the first encryption and decryption algorithm to obtain a key-related data cipher text.

After the edge port generates the key-related data corresponding to the second to encryption and decryption algorithm, the key-related data can be encrypted by using the private key of the first encryption and decryption algorithm and by using an encryption mode of the first encryption and decryption algorithm to obtain the key-related data cipher text.

Step 106: transmitting, by the edge port, the-related data cipher text to the encryption and decryption platform.

In this step, the edge port can transmit the key-related data cipher text encrypted by the private key of the first encryption and decryption algorithm to the encryption and decryption platform. It is difficult to crack the asymmetric encryption algorithm itself, and the key-related data cipher text encrypted by the private key of the first encryption and decryption algorithm can only be decrypted by the public key of the first encryption and decryption algorithm.

With regard to the method of encryption and decryption initialization configuration according to the embodiment of the present disclosure, if it is desired to steal the key-related data corresponding to the second encryption and decryption algorithm, the public key corresponding to the first encryption and decryption algorithm must be intercepted in advance, which itself increases the stealing difficulty of the key-related data. In addition, even if the public key corresponding to the first encryption and decryption algorithm is intercepted, it is also necessary to crack which kind the asymmetric encryption and decryption algorithm corresponding to the public key is specifically. Therefore, performing encryption and decryption initialization configuration by the method according to the embodiment of the present disclosure can greatly increase the stealing difficulty of the key-related data, i.e., the security of the key-related data is improved.

Therefore, the key-related data is not easily stolen during transmission, and the security of the key-related data is improved. Further, when the encryption and decryption platform encrypts subsequently data via the key corresponding to the second encryption and decryption algorithm, the security of the encrypted data will also be improved accordingly.

Step 107: receiving, by the encryption and decryption platform, the key-related data cipher text transmitted by the edge port.

Step 108: decrypting, by the encryption and decryption platform, the key-related data cipher text according to the public key by decryption using the first encryption and decryption algorithm to obtain the key-related data, and complete initialization configuration.

After receiving the key-related data cipher text encrypted by the private key of the first encryption and decryption algorithm, the encryption and decryption platform can decrypt the key-related data cipher text by using the public key of the first encryption and decryption algorithm and by using a decryption mode of the first encryption and decryption algorithm to obtain the key-related data, and store the key-related data. When the storage of the key-related data is completed in the encryption and decryption platform, the encryption and decryption initialization configuration is also completed. The encryption and decryption platform then encrypts and decrypts the data using a second encryption and decryption algorithm based on the key-related data.

According to an embodiment of the present disclosure, the edge port may generate the public key and the private key corresponding to the asymmetric encryption and decryption algorithm, and transmit the public key to the encryption and decryption platform. Then, the edge port may encrypt the key-related data of the symmetric encryption and decryption algorithm required by the encryption and decryption platform via the private key corresponding to the asymmetric encryption and decryption algorithm, and transmit the encrypted cipher text to the encryption and decryption platform, and then the encryption and decryption platform may decrypt the cipher text according to the public key corresponding to the asymmetric encryption and decryption algorithm to obtain the key-related data of the symmetric encryption and decryption algorithm. According to the embodiment of the present disclosure, the key-related data required by the encryption and decryption platform can be encrypted at the edge port by cracking the private key of the asymmetric encryption and decryption algorithm with high difficulty, and then transmitted to the encryption and decryption platform, and the encrypted key-related data can only be decrypted by the public key of the asymmetric encryption and decryption algorithm. Therefore, the key-related data is not easy to be stolen in the transmission process, which improves the security of the key-related data.

The steps performed by the edge port and the encryption and decryption platform, respectively, are described in detail below.

Referring to FIG. 4, which is shown a flow chart of the steps of another method of encryption and decryption initialization configuration according to the embodiment of the present disclosure, applied to an edge port in a security system, the security system further includes an encryption and decryption platform, and the edge port is communication connected to the encryption and decryption platform.

In some alternative embodiments, the communication between the edge port and the encryption and decryption platform may be performed in a request-response manner based on a custom communication protocol.

Since the data format in the custom communication protocol can be customized, in the data transmitted through the custom communication protocol, the meaning represented by each byte or data segment is difficult to crack, and transmitting the encrypted key-related data cipher text through the custom communication protocol can further improve the security of the key-related data.

In addition, the communication between the edge port and the encryption and decryption platform uses a request-response mode, and the encryption and decryption platform can request key-related data from the edge port in time after the encryption and decryption platform is power-on. And accordingly, the edge port can also provide key-related data for the encryption and decryption platform in time, so that the encryption and decryption platform completes the initialization configuration of encryption and decryption as soon as possible after the encryption and decryption platform is power-on, thereby starting the work of data encryption and decryption as soon as possible and improving the operation efficiency of the security system.

For a better understanding of the present disclosure, the steps of certain embodiments of the present disclosure will be described in detail below by taking the first encryption and decryption algorithm as the RSA algorithm and the second encryption and decryption algorithm as the AES algorithm.

The bit width of the data encrypted and decrypted by the RSA algorithm is 1024 bit, i.e., the RSA algorithm needs to divide the data to be encrypted or decrypted into data segments with a fixed length of 1024 bit, and then perform encryption or decryption processing. In addition, the RSA algorithm can use the Montgomery modular multiplication algorithm for operation, and the Montgomery modular multiplication algorithm can avoid division operation through shift operation and save calculation.

The AES algorithm encrypts and decrypts data with a bit width of 128 bit, and can use five encryption modes including CBC mode.

In particular, the method comprises the steps of:

Step 201: generating a public key and a private key corresponding to a first encryption and decryption algorithm; wherein the first encryption and decryption algorithm is an asymmetric encryption and decryption algorithm.

In some asymmetric encryption algorithms, such as the RSA algorithm, the public key may include a modulus N and a power e, the public key may be represented as (N, e), and the private key may include a modulus N and a modulo-inverse element d, the private key may be represented as (N, d).

Taking the RSA algorithm as an example, the generation process of the public key (N, e) is roughly as follows:

randomly selecting two large prime numbers p and q, where p is not equal to q, and calculating N=pq;

according to Euler function, r=(p−1) (q−1) is obtained;

selecting an integer e which is less than r, and obtaining a modulus inverse element of e with respect to modulus r, named as d (the modulus inverse element exists if and only if e and r are mutually prime);

and destroying records for p and q.

Where (N, e) is the public key of the RSA algorithm and (N, d) is the private key of the RSA algorithm.

Step 202: transmitting the public key to the encryption and decryption platform after the encryption and decryption platform is power-on.

After the encryption and decryption platform is power-on, the edge port may transmit the public key (N, e) to the encryption and decryption platform.

Figure 6:
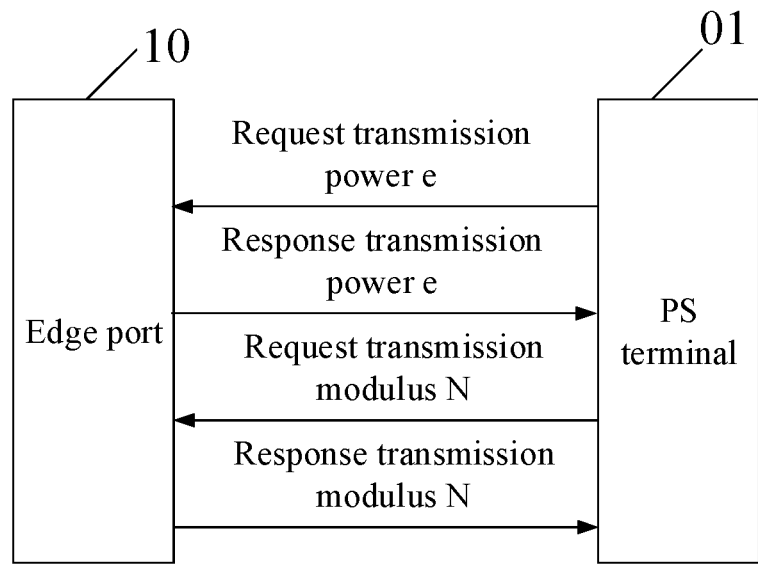
FIG. 6 shows a schematic diagram of another transmis-
sion public key according to an embodiment of the present
disclosure.

Since the communication between the edge port and the encryption and decryption platform may be in a request-response manner, referring to FIGS. 5 and 6, in some alternative embodiments, step 202 may be specifically implemented by:

transmitting the modulus to the encryption and decryption platform when a modulus transmission request transmitted by the encryption and decryption platform is received; wherein the modulus transmission request is transmitted after the encryption and decryption platform is power-on;

transmitting the power to the encryption and decryption platform when a power transmission request transmitted by the encryption and decryption platform is received; wherein the power transmission request is transmitted after the encryption and decryption platform is power-on.

Wherein the encryption and decryption platform can transmit the modulus transmission request and the power transmission request to the edge port after the encryption and decryption platform is power-on to request to obtain the public key (N, e). When receiving the modulus transmission request, the edge port can transmit the modulus N to the encryption and decryption platform. When receiving the power transmission request, the edge port can transmit the power e to the encryption and decryption platform.

It should be noted that in the embodiments of the present disclosure, the order of transmission of the modulus transmission requests and the power transmission requests is not limited. In practice, the encryption and decryption platform can first transmit a modulus transmission request, and then transmit a power transmission request after receiving the modulus N, as shown in FIG. 5; the encryption and decryption platform can also transmit a power transmission request first, and transmit a modulus transmission request after receiving the power e, as shown in FIG. 6.

Step 203: generating key-related data corresponding to a second encryption and decryption algorithm; wherein the key-related data at least comprises a key corresponding to a second encryption and decryption algorithm, and the second encryption and decryption algorithm is a symmetric encryption and decryption algorithm.

In practice, some symmetric encryption and decryption algorithms may include at least two encryption and decryption modes, some symmetric encryption and decryption algorithms or some modes in some symmetric encryption and decryption algorithms can realize the encryption and decryption of data only through a key, while some symmetric encryption and decryption algorithms or some modes in some symmetric encryption and decryption algorithms require not only a key but also some initial parameters to assist in the encryption and decryption of data.

Therefore, according to an embodiment of the present disclosure, the key-related data may include initial parameters required for encryption and decryption by the key corresponding to the second encryption and decryption algorithm, in addition to the key corresponding to the second encryption and decryption algorithm.

For example, the AES algorithm may include five encryption and decryption modes: Electronic Codebook Book (ECB), Cipher Block Chaining (CBC), Counter (CTR), Cipher FeedBack (CFB) and Output FeedBack (OFB). In the ECB mode, only the AES key is needed for the encryption and decryption, while in the CBC mode, not only the AES key but also an initial parameter (i.e., a vector, also called AES initialization vector or AES initial variable) is needed.

Figure 7:
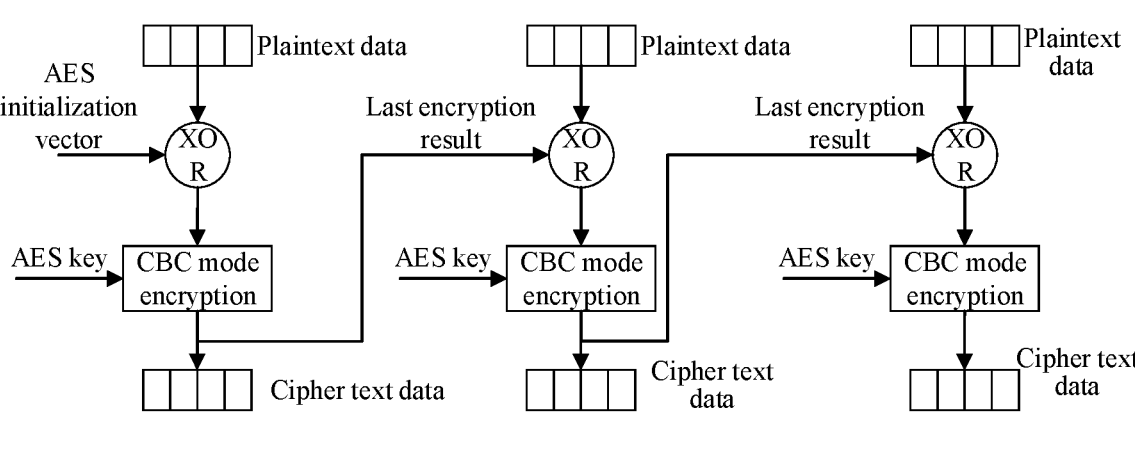
FIG. 7 shows a schematic diagram of a CBC mode
encryption process of an AES algorithm according to an
embodiment of the present disclosure.

In the CBC mode of the AES algorithm, the initial parameters (i.e., the AES initialization vector) are applied as follows:

Encryption process: referring to FIG. 7, a first group of 128 bit plaintext data is XOR operated with an AES initialization vector, and then CBC mode encryption is performed via an AES key to obtain a first group of 128 bit cipher text data; a second group of 128 bit plaintext data is XOR operated with the calculated first group of 128 bit cipher text data, and then CBC mode encryption is performed via the AES key to obtain the second group of 128 bit cipher text data; a third group of 128 bit plaintext data is XOR operated with the calculated second group of 128 bit cipher text data, and then CBC mode encryption is performed via the AES key to obtain the third group of 128 bit cipher text data and so on until all the plaintext data is encrypted.

Figure 8:
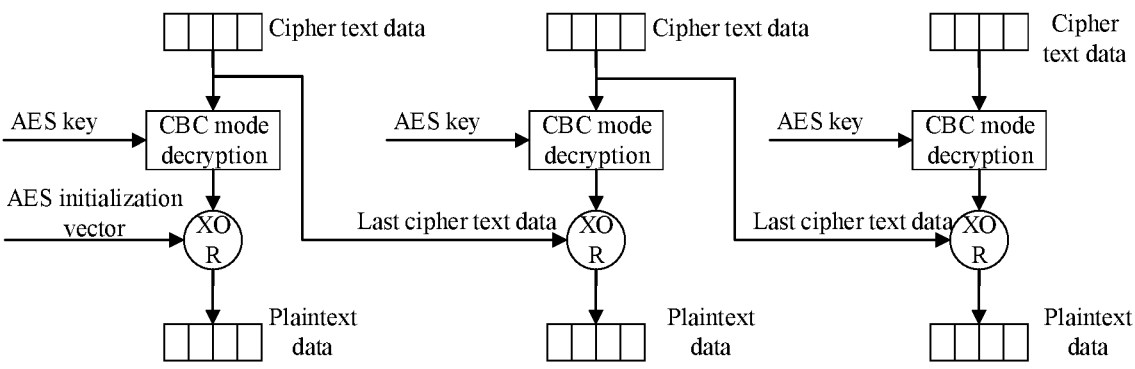
FIG. 8 shows a schematic diagram of a CBC mode
decryption process of an AES algorithm according to an
embodiment of the present disclosure.

Decryption process: referring to FIG. 8, after the first group of 128 bit cipher text data is decrypted via the AES key using the CBC mode, the first group of 128 bit cipher text data is XOR operated with an AES initialization vector to obtain a first group of 128 bit plaintext data; after the second group of 128 bit cipher text data is decrypted via the AES key using the CBC mode, the second group of 128 bit cipher text data is XOR operated with the first group of 128 bit cipher text data to obtain the second group of 128 bit plaintext data; after the third group of 128 bit cipher text data is decrypted via the AES key using the CBC mode, the third group of 128 bit cipher text data is XOR operated with the second group of 128 bit cipher text data to obtain the third group of 128 bit plaintext data and so on until all the cipher text data is decrypted.

Step 204: encrypting the key-related data according to the private key by encryption using the first encryption and decryption algorithm to obtain a key-related data cipher text.

In this step, the edge port can encrypt the key corresponding to the second encryption and decryption algorithm according to the private key by encryption using the first encryption and decryption algorithm to obtain the key cipher text. The edge port can also encrypt the initial parameter corresponding to the second encryption and decryption algorithm according to the private key by encryption using the first encryption and decryption algorithm to obtain the initial parameter cipher text. The key-related data cipher text also comprises a key cipher text and an initial parameter cipher text.

It should be noted that in the embodiments of the present disclosure, the generation order of the key cipher text and the initial parameter cipher text is not limited. The edge port may first generate the key cipher text and then generate the initial parameter cipher text, or may first generate the initial parameter cipher text and then generate the key cipher text.

Taking the first encryption and decryption algorithm as the RSA algorithm and the second encryption and decryption algorithm as the AES algorithm for example, the edge port can encrypt the AES key according to the private key (N, d) and by encryption using the RSA algorithm to obtain the AES key cipher text, and the edge port can also encrypt the AES initialization vector according to the private key (N, d) and by encryption using the RSA algorithm to obtain the initial parameter cipher text.

Step 205: transmitting the key-related data cipher text to the encryption and decryption platform, so that the encryption and decryption platform decrypts the key-related data cipher text according to the public key by decryption using the first encryption and decryption algorithm to obtain the key-related data, and complete initialization configuration.

In some alternative embodiments, the key-related data further comprises initial parameters required for encryption and decryption by the key, and the key-related data cipher text comprises a key cipher text corresponding to the key and an initial parameter cipher text corresponding to the initial parameters. Accordingly, in the case where the communication between the edge port and the encryption and decryption platform is performed using a request-response method, referring to FIGS. 9 and 10, in some alternative embodiments, the step of transmitting key-related data cipher text to the encryption and decryption platform in step 205 can be specifically achieved by the following method comprising:

transmitting the key cipher text to the encryption and decryption platform when a key cipher text transmission request transmitted by the encryption and decryption platform is received; and transmitting the initial parameter cipher text to the encryption and decryption platform when an initial parameter cipher text transmission request transmitted by the encryption and decryption platform is received.

After obtaining the public key (N, e), the encryption and decryption platform can transmit the key cipher text transmission request and the initial parameter cipher text transmission request to the edge port to request to obtain the key cipher text and the initial parameter cipher text. When receiving the key cipher text transmission request, the edge port can transmit the key cipher text to the encryption and decryption platform; and when receiving the initial parameter cipher text transmission request, the edge port can transmit the initial parameter cipher text to the encryption and decryption platform.

Figure 9:
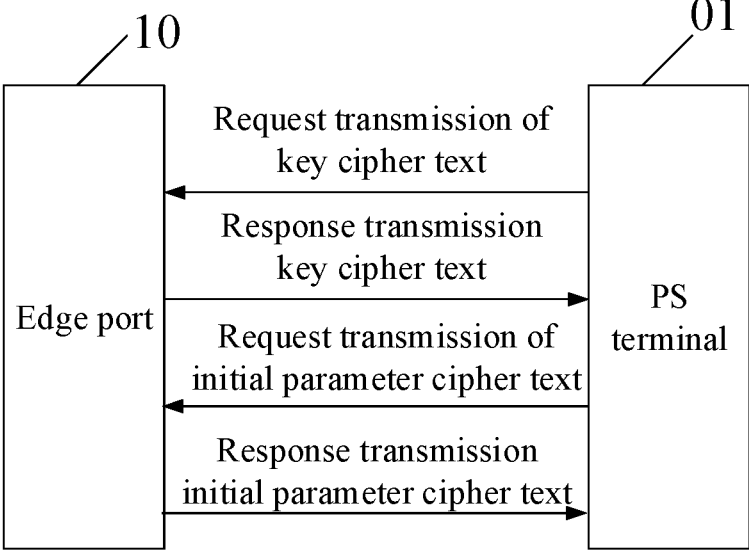
FIG. 9 shows a schematic diagram of a transmission
cipher text according to an embodiment of the present
disclosure.
Figure 10:
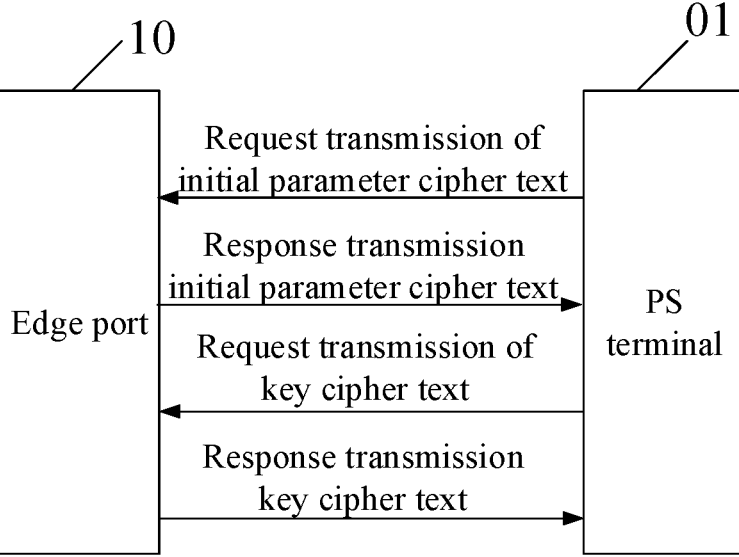
FIG. 10 shows a schematic diagram of another transmis-
sion cipher text according to an embodiment of the present
disclosure.

It should be noted that in the embodiments of the present disclosure, the order of transmitting the key cipher text transmission request and the initial parameter cipher text transmission request is not limited. In practice, the encryption and decryption platform may first transmit the key cipher text transmission request, and then transmit the initial parameter cipher text transmission request after receiving the key cipher text, as shown in FIG. 9. The encryption and decryption platform may also transmit the initial parameter cipher text transmission request first, and then transmit the key cipher text transmission request after receiving the initial parameter cipher text, as shown in FIG. 10.

After receiving the key cipher text and the initial parameter cipher text corresponding to the second encryption and decryption algorithm, the encryption and decryption platform can decrypt the key cipher text according to the public key corresponding to the first encryption and decryption algorithm and by decryption using the first encryption and decryption algorithm to obtain the key corresponding to the second encryption and decryption algorithm, and decrypt the initial parameter cipher text according to the public key corresponding to the first encryption and decryption algorithm and by decryption using the first encryption and decryption algorithm to obtain the initial parameter corresponding to the second encryption and decryption algorithm, and then store the key corresponding to the second encryption and decryption algorithm and the initial parameter, thereby completing the initialization configuration.

Taking the first encryption and decryption algorithm as the RSA algorithm and the second encryption and decryption algorithm as the AES algorithm as an example, after receiving the AES key cipher text and the AES initialization vector cipher text corresponding to the AES algorithm, the encryption and decryption platform can decrypt the AES key cipher text according to the RSA public key by means of the decryption method of the RSA algorithm to obtain the AES key, and decrypt the AES initialization vector cipher text according to the RSA public key by means of the decryption method of the RSA algorithm to obtain the AES initialization vector, and then store the AES key and the AES initialization vector to complete the initialization configuration.

According to an embodiment of the present disclosure, the edge port may generate the public key and the private key corresponding to the asymmetric encryption and decryption algorithm, and transmit the public key to the encryption and decryption platform. Then, the edge port may encrypt key-related data of the symmetric encryption and decryption algorithm required by the encryption and decryption platform via the private key corresponding to the asymmetric encryption and decryption algorithm, and transmit the encrypted cipher text to the encryption and decryption platform. The encryption and decryption platform may decrypt the cipher text according to the public key corresponding to the asymmetric encryption and decryption algorithm to obtain the key-related data of the symmetric encryption and decryption algorithm. According to the embodiment of the present disclosure, the key-related data required by the encryption and decryption platform can be encrypted at the edge port by cracking the private key of the asymmetric encryption and decryption algorithm with high difficulty, and then transmitted to the encryption and decryption platform, and the encrypted key-related data can only be decrypted by the public key of the asymmetric encryption and decryption algorithm. Therefore, the key-related data is not easy to be stolen in the transmission process, which improves the security of the key-related data.

Referring to FIG. 11, there is shown a flow chart of the steps of yet another encryption and decryption initialization configuration method according to an embodiment of the present disclosure, applied to an encryption and decryption platform in a security system, the security system further includes an edge port communication connected to the encryption and decryption platform, and the method comprises the following steps of:

Step 301: receiving a public key corresponding to a first encryption and decryption algorithm transmitted by an edge port after the encryption and decryption platform is power-on; wherein the public key is generated by the edge port which also generates a private key corresponding to the first encryption and decryption algorithm, and the first encryption and decryption algorithm is an asymmetric encryption and decryption algorithm.

In some alternative embodiments, the public key comprises a modulus and a power. And accordingly, in the case where the communication between the edge port and the encryption and decryption platform uses a request-response method based on a custom communication protocol, and step 301 can be specifically realized by the following method comprising:

transmitting a modulus transmission request to an edge port after the encryption and decryption platform is power-on;

receiving the modulus transmitted by the edge port;

transmitting a power transmission request to the edge port after the encryption and decryption platform is power-on; and receiving the power of the edge port transmission.

In some alternative embodiments, the encryption and decryption platform comprises a processor system (PS terminal) and a programmable logic device (PL terminal), and the encryption and decryption platform can send a request to the edge port via the PS terminal, and receive public key data transmitted by the edge port via the PS terminal.

Wherein the above-mentioned step of receiving the modulus transmitted by the edge port specifically comprises: receiving, by the processor system, the modulus transmitted by the edge port. The above-mentioned step of receiving the power transmitted by the edge port specifically comprises: receiving, by the processor system, the power transmitted by the edge port.

The encryption and decryption platform can send a request to the edge port through the PS terminal, and receive public key data transmitted by the edge port through the PS terminal.

Accordingly, after step 301, the following steps may also be included:

S1: calculating and obtaining, by the processor system, target parameters required to perform encryption and decryption via the public key according to the modulus;

S2: transmitting, by the processor system, the modulus, the power, and the target parameters to the programmable logic device for storage.

Taking the first encryption and decryption algorithm as an example of the RSA algorithm, when performing data encryption and decryption through the RSA algorithm, three target parameters of R, T and N0 are also required. Therefore, after receiving the public key (N, e) at the PS terminal, the three target parameters of R, T and N0 are also required to be obtained through calculation according to the modulus N, wherein $R=(2^{1024})\% N$, $T=(2^{2048})\% N$, and $(N0*N)\% (2^{32})=-1$, and in the above-mentioned three formulas, % is a remainder operator.

Therefore, after calculating the target parameters R, T and N0 according to the modulus N, the PS terminal can transmit the three target parameters of the modulus N, the power e and R, T and N0 to the PL terminal, and the PL terminal stores same.

Figure 12:
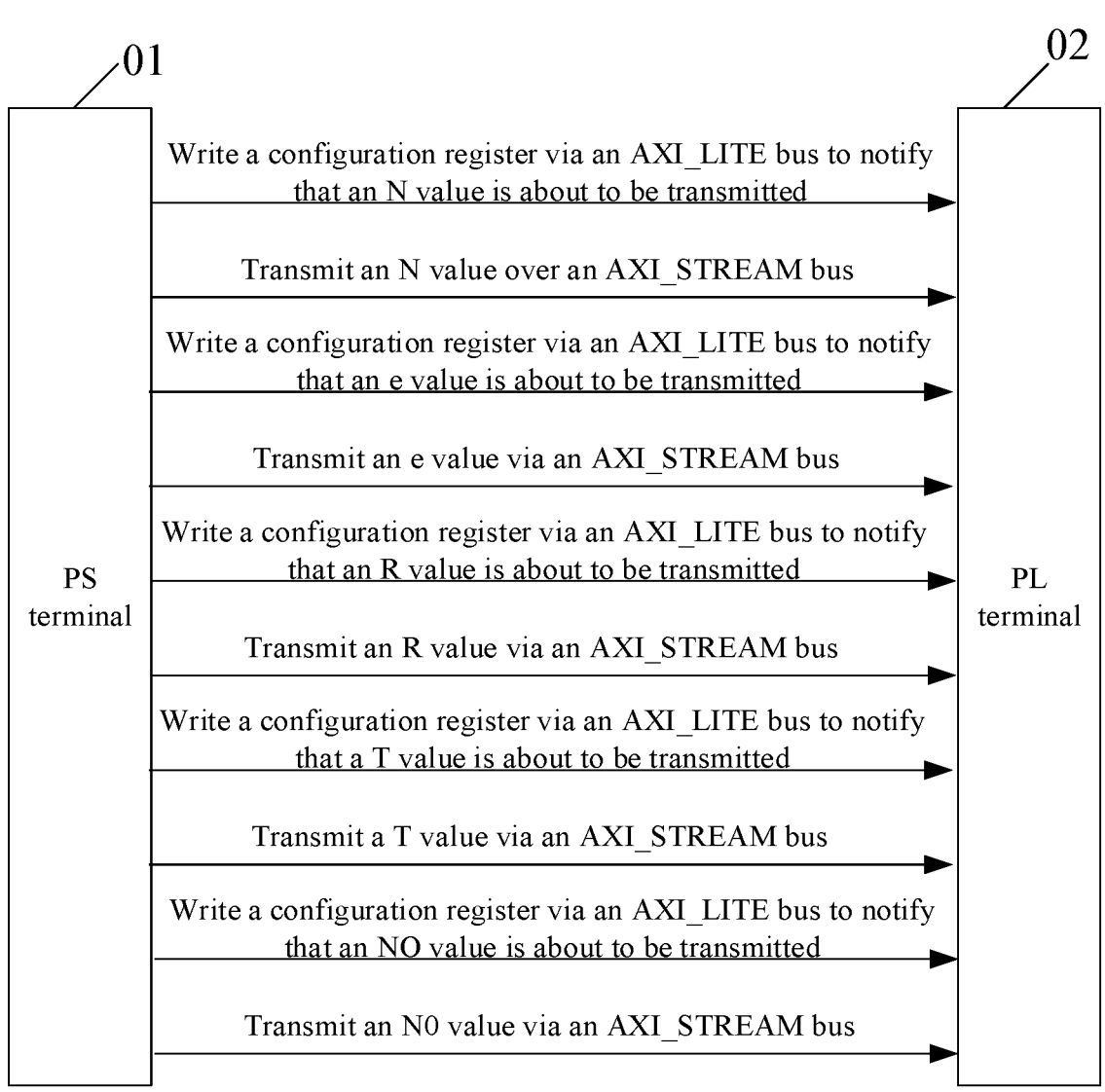
FIG. 12 shows a schematic diagram of an interaction
process between a PS terminal and a PL terminal according
to an embodiment of the present disclosure.

Referring to FIG. 12, step S2 may specifically comprise the following steps of:

writing, by the processor system, a data type of the modulus into a configuration register of the programmable logic device;

transmitting, by the processor system, the modulus to the programmable logic device;

storing, by the programmable logic device, the modulus in the first storage area according to the data type of the modulus in the configuration register;

writing, by the processor system, a data type of the power into the configuration register of the programmable logic device;

transmitting, by the processor system, the power to the programmable logic device;

storing, by the programmable logic device, the power in the second storage area according to the data type of the power in the configuration register.

In the case where at least one target parameter is included, step S2 may specifically further include the following steps of:

performing the following operation for each target parameter in turn:

writing, by the processor system, a data type of the target parameter into the configuration register of the programmable logic device;

transmitting, by the processor system, the target parameter to the programmable logic device;

receiving, by the programmable logic device, the target parameter, and storing the target parameter in a third storage area according to the data type of the target parameter in the configuration register;

wherein the data types of the target parameters are different, and the third storage areas corresponding to the target parameters are different.

Referring to FIG. 12, a procedure of transmitting modulus N, power e, and three target parameters R, T and N0 to the PL terminal by the PS terminal is exemplarily illustrated. For each of the five target parameters, modulus N, power e, R, T, and N0, the PS terminal may first write the relevant configuration register of the PL terminal through the AXI_LITE bus to inform the PL terminal of the data type to be transmitted, and then transmit the data of the corresponding data type to the PL terminal through the AXI_STREAM bus. When receiving a data, the PL terminal can read the configuration register to determine the data type of the currently received data, and store the received data in different storage areas according to different data types. Each data type may correspond to a preset storage area.

Step 302: receiving key-related data cipher text transmitted by the edge port; wherein the key-related data cipher text and is obtained by encrypting the key-related data according to the private key by encryption using the first encryption and decryption algorithm, and the key-related data corresponding to a second encryption and decryption algorithm is generated by the edge port.

In some alternative embodiments, the key-related data further comprises an initial parameter required for encryption and decryption via the key, and the key-related data cipher text comprises the key cipher text corresponding to the key and the initial parameter cipher text corresponding to the initial parameter. Accordingly, in the case where the communication between the edge port and the encryption and decryption platform uses a request-response method based on a custom communication protocol, step 302 can be specifically realized by the following method comprising:

transmitting a key cipher text transmission request to the edge port;

receiving the key cipher text transmitted by the edge port;

transmitting an initial parameter cipher text transmission request to the edge port after the encryption and decryption platform is power-on;

receiving the initial parameter cipher text transmitted by the edge port.

The above-mentioned step of receiving the key cipher text transmitted by the edge port specifically comprises: receiving, by the processor system, the key cipher text transmitted by the edge. The above-mentioned step of receiving the initial parameter cipher text transmitted by the edge port specifically comprises: receiving, by the processor system, the initial parameter cipher text transmitted by the edge.

The encryption and decryption platform can send a request to the edge port through the PS terminal, and receive cipher text data transmitted by the edge port through the PS terminal.

Step 303: decrypting the key-related data cipher text according to the public key by decryption using the first encryption and decryption algorithm to obtain the key-related data, and complete initialization configuration.

Figure 13:
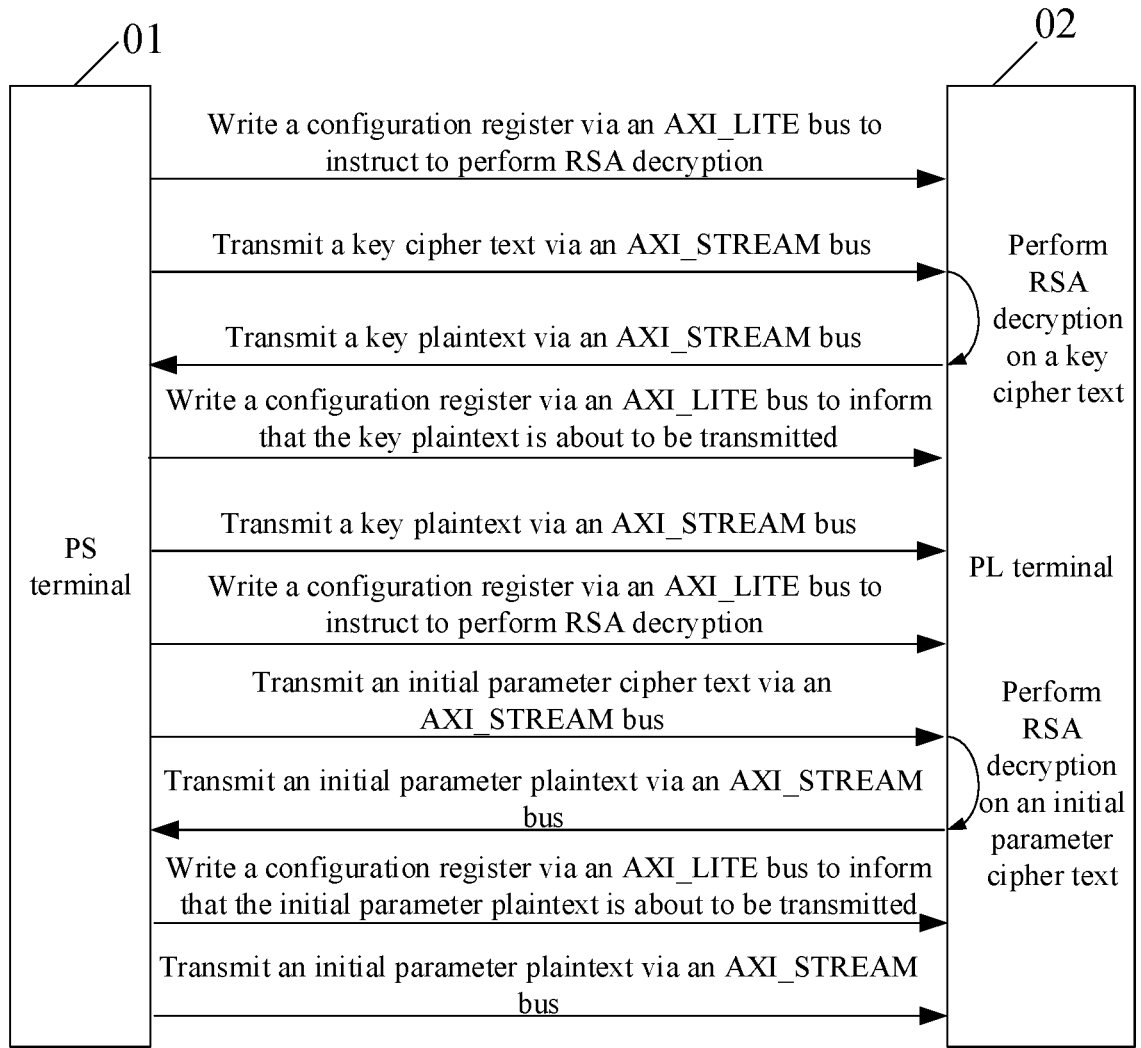
FIG. 13 shows a schematic diagram of another interaction
process between a PS terminal and a PL terminal according
to an embodiment of the present disclosure.

Referring to FIG. 13, step 303 may specifically include the following steps of:

writing, by the processor system, a decryption instruction of the key cipher text into a configuration register of the programmable logic device;

transmitting, by the processor system, the key cipher text to the programmable logic device;

executing, by the programmable logic device, a step of decrypting the key cipher text according to the public key by decryption using the first encryption and decryption algorithm according to the decryption instruction of the key cipher text in the configuration register, to obtain the key;

transmitting, by the programmable logic device, the key to the processor system;

writing, by the processor system, the data type of the key into the configuration register of the programmable logic device;

transmitting, by the processor system, the key to the programmable logic device; and storing, by the programmable logic device, the key in the fourth storage area according to the data type of the key in the configuration register.

Referring to FIG. 13, step 303 may also specifically further comprise the following steps of:

writing, by the processor system, a decryption instruction of the initial parameter cipher text into a configuration register of the programmable logic device;

transmitting, by the processor system, the initial parameter cipher text to the programmable logic device;

executing, by the programmable logic device, a step of decrypting the initial parameter cipher text by decryption using the first encryption and decryption algorithm according to the public key according to a decryption instruction of the initial parameter cipher text in the configuration register, to obtain the initial parameter;

transmitting, by the programmable logic device, initial parameters to the processor system;

writing, by the processor system, the data type of the initial parameter into a configuration register of the programmable logic device;

transmitting, by the processor system, the initial parameter to the programmable logic device; and storing, by the programmable logic device, the initial parameter in the fifth storage area according to the data type of the initial parameter in the configuration register.

Referring to FIG. 13, the PS terminal can first write a relevant configuration register of the PL terminal via an AXI_LITE bus to inform the PL terminal to perform an RSA decryption operation on the data (the key cipher text and the initial parameter cipher text) received next via the AXI_STREAM bus, and the PL terminal only decrypts the data, without knowing the data type and use. And then the PS terminal transmits the key cipher text and the initial parameter cipher text to the PL terminal via the AXI_STREAM bus. After the decryption is completed, the PL terminal then transmits the decrypted plaintext data (the key and the initial parameter) to the PS terminal via the AXI_STREAM bus. After receiving the plaintext data, the PS terminal performs a write operation on the relevant configuration register of the PL terminal via an AXI_LITE bus to notify the PL terminal of the data type to be transmitted, and then transmits the above-mentioned plaintext data to the PL terminal via the AXI_STREAM bus. When received by the PL terminal, the configuration register can be read, so that the data type of the currently received data can be determined, and then the received data is stored in a corresponding storage area according to the data type.

It should be noted that the encryption and decryption platform may first decrypt and store the key, and then decrypt and store the initial parameter, or may first decrypt and store the initial parameter, and then decrypt and store the key, and the embodiments of the present disclosure are not limited thereto.

After the above-mentioned operation, the encryption and decryption initialization configuration process is completed, and the process effectively avoids the situation that the key-related data is stolen and destroyed by the cipher text transmission of the key-related data of the second encryption and decryption algorithm, so that the whole data encryption transmission chain is more secure. The PS terminal assists in generating the target parameters used in the encryption process of the first encryption and decryption algorithm, which saves the asymmetric encryption calculation time and improves the encryption efficiency, and also saves the logic resources of the PL terminal.

After the initialization configuration is completed, when the encryption and decryption screen platform needs to transmit data, the data can be encrypted via the key-related data of the second encryption and decryption algorithm, and then the encrypted data is transmitted to the corresponding device. When the encryption and decryption platform receives the data, the data can be decrypted via the key-related data of the second encryption and decryption algorithm, and then corresponding operations are performed according to the decrypted data.

According to an embodiment of the present disclosure, the edge port may generate the public key and the private key corresponding to the asymmetric encryption and decryption algorithm, and transmit the public key to the encryption and decryption platform. Then, the edge port may encrypt key-related data of the symmetric encryption and decryption algorithm required by the encryption and decryption platform via the private key corresponding to the asymmetric encryption and decryption algorithm, and transmit the encrypted cipher text to the encryption and decryption platform. And then the encryption and decryption platform may decrypt the cipher text according to the public key corresponding to the asymmetric encryption and decryption algorithm to obtain the key-related data of the symmetric encryption and decryption algorithm. According to the embodiment of the present disclosure, the key-related data required by the encryption and decryption platform can be encrypted at the edge port by cracking the private key of the asymmetric encryption and decryption algorithm with high difficulty, and then transmitted to the encryption and decryption platform, and the encrypted key-related data can only be decrypted by the public key of the asymmetric encryption and decryption algorithm. Therefore, the key-related data is not easy to be stolen in the transmission process, which improves the security of the key-related data.

Figures 14, 15:
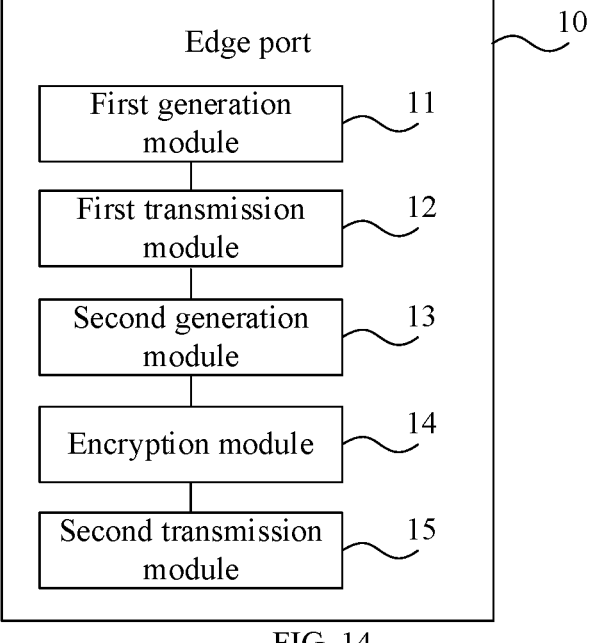
FIG. 14 shows a block diagram of an edge port according
to an embodiment of the present disclosure.
FIG. 15 shows a block diagram of an encryption and
decryption platform according to an embodiment of the
present disclosure.

Referring to FIG. 14, an edge port 10 according to an embodiment of the present disclosure is shown, the edge port 10 belongs to a security system 100, the security system 100 further includes an encryption and decryption platform 20, the edge port 10 is communication connected to the encryption and decryption platform 20, and the edge port 10 includes:

a first generation module 11 configured to generate a public key and a private key corresponding to a first encryption and decryption algorithm, wherein the first encryption and decryption algorithm is an asymmetric encryption and decryption algorithm;

a first transmitting module 12 configured to transmit the public key to the encryption and decryption platform after the encryption and decryption platform is power-on;

a second generation module 13 configured to generate key-related data corresponding to a second encryption and decryption algorithm, wherein the key-related data at least includes a key corresponding to the second encryption and decryption algorithm, and the second encryption and decryption algorithm being a symmetric encryption and decryption algorithm;

an encryption module 14 configured to encrypt the key-related data according to the private key by encryption using the first encryption and decryption algorithm to obtain a key-related data cipher text; and a second transmission module 15 configured to transmit the key-related data cipher text to the encryption and decryption platform, so that the encryption and decryption platform decrypts the key-related data cipher text according to the public key by decryption using the first encryption and decryption algorithm to obtain the key-related data, and complete initialization configuration.

According to an embodiment of the present disclosure, the edge port may generate the public key and the private key corresponding to the asymmetric encryption and decryption algorithm, and transmit the public key to the encryption and decryption platform. Then, the edge port may encrypt key-related data of the symmetric encryption and decryption algorithm required by the encryption and decryption platform via the private key corresponding to the asymmetric encryption and decryption algorithm, and transmit the encrypted cipher text to the encryption and decryption platform. And then the encryption and decryption platform may decrypt the cipher text according to the public key corresponding to the asymmetric encryption and decryption algorithm to obtain the key-related data of the symmetric encryption and decryption algorithm. According to the embodiment of the present disclosure, the key-related data required by the encryption and decryption platform can be encrypted at the edge port by cracking the private key of the asymmetric encryption and decryption algorithm with high difficulty, and then transmitted to the encryption and decryption platform, and the encrypted key-related data can only be decrypted by the public key of the asymmetric encryption and decryption algorithm. Therefore, the key-related data is not easy to be stolen in the transmission process, which improves the security of the key-related data.

Referring to FIG. 15, the encryption and decryption platform 20 according to an 20 embodiment of the present disclosure is shown, wherein the encryption and decryption platform belongs to a security system 100, and the security system 100 further includes an edge port 10, and the edge port 10 is communication connected to the encryption and decryption platform 20, and the encryption and decryption platform 20 includes:

a first receiving module 21 configured to receive a public key corresponding to a first encryption and decryption algorithm transmitted by the edge port after the encryption and decryption platform is power-on; wherein the public key is generated by the edge port, the edge port further generates a private key corresponding to the first encryption and decryption algorithm, and the first encryption and decryption algorithm is an asymmetric encryption and decryption algorithm;

a second receiving module 22 configured to receive a key-related data cipher text transmitted by the edge port; wherein the key cipher text is obtained by encrypting the key-related data according to the private key by encryption using the first encryption and decryption algorithm, and the key-related data corresponding to a second encryption and decryption algorithm is generated by the edge port; and a decryption module 23 configured to decrypt the key-related data cipher text according to the public key by decryption using the first encryption and decryption algorithm to obtain the key-related data, and complete initialization configuration.

According to an embodiment of the present disclosure, the edge port may generate the public key and the private key corresponding to the asymmetric encryption and decryption algorithm, and transmit the public key to the encryption and decryption platform. Then, the edge port may encrypt key-related data of the symmetric encryption and decryption algorithm required by the encryption and decryption platform via the private key corresponding to the asymmetric encryption and decryption algorithm, and transmit the encrypted cipher text to the encryption and decryption platform. And then the encryption and decryption platform may decrypt the cipher text according to the public key corresponding to the asymmetric encryption and decryption algorithm to obtain the key-related data of the symmetric encryption and decryption algorithm. According to the embodiment of the present disclosure, the key-related data required by the encryption and decryption platform can be encrypted at the edge port by cracking the private key of the asymmetric encryption and decryption algorithm with high difficulty, and then transmitted to the encryption and decryption platform, and the encrypted key-related data can only be decrypted by the public key of the asymmetric encryption and decryption algorithm. Therefore, the key-related data is not easy to be stolen in the transmission process, which improves the security of the key-related data.

Referring to FIGS. 2 and 3, the embodiment of the present disclosure further discloses a security system 100 comprising an edge port 10 and an encryption and decryption platform 20, wherein the edge port 10 is communication connected to the encryption and decryption platform 20;

the edge port 10 is configured to generate a public key and a private key corresponding to a first encryption and decryption algorithm, wherein the first encryption and decryption algorithm is an asymmetric encryption and decryption algorithm;

the edge port 10 is further configured to transmit the public key to the encryption and decryption platform 20 after the encryption and decryption platform is power-on;

the encryption and decryption platform 20 is configured to receive the public key transmitted by the edge port 10 after the encryption and decryption platform is power-on;

the edge port 10 is further configured to generate key-related data corresponding to a second encryption and decryption algorithm, wherein the key-related data at least includes a key corresponding to the second encryption and decryption algorithm, and the second encryption and decryption algorithm is a symmetric encryption and decryption algorithm;

the edge port 10 is further configured to encrypt the key-related data according to the private key by encryption using the first encryption and decryption algorithm to obtain a key-related data cipher text;

the edge port 10 is further configured to transmit the key-related data cipher text to the encryption and decryption platform 20;

the encryption and decryption platform 20 is further configured to receive the key-related data cipher text transmitted by the edge port 10;

The encryption and decryption platform 20 is further configured to decrypt the key-related data cipher text according to the public key by decryption using the first encryption and decryption algorithm to obtain the key-related data and complete initialization configuration.

According to an embodiment of the present disclosure, the edge port may generate the public key and the private key corresponding to the asymmetric encryption and decryption algorithm, and transmit the public key to the encryption and decryption platform. Then, the edge port may encrypt key-related data of the symmetric encryption and decryption algorithm required by the encryption and decryption platform via the private key corresponding to the asymmetric encryption and decryption algorithm, and transmit the encrypted cipher text to the encryption and decryption platform. And then the encryption and decryption platform may decrypt the cipher text according to the public key corresponding to the asymmetric encryption and decryption algorithm to obtain the key-related data of the symmetric encryption and decryption algorithm. According to the embodiment of the present disclosure, the key-related data required by the encryption and decryption platform can be encrypted at the edge port by cracking the private key of the asymmetric encryption and decryption algorithm with high difficulty, and then transmitted to the encryption and decryption platform, and the encrypted key-related data can only be decrypted by the public key of the asymmetric encryption and decryption algorithm. Therefore, the key-related data is not easy to be stolen in the transmission process, which improves the security of the key-related data.

The embodiments of the edge port, the encryption and decryption platform and the security system described above are relatively simple in that they are substantially similar to the method embodiments, which are described referring to the description of the method embodiments.

Embodiments of the present disclosure also disclose an edge port comprising a processor, a memory, and a program stored on the memory and executable on the processor, when the program is executed, causes the processor to implement the method steps as implemented by the edge port in the embodiments above.

Embodiments of the present disclosure also disclose an encryption and decryption platform comprising a processor system, a programmable logic device, and a program stored on a memory and executable on the processor system and the programmable logic device, which when executed, performs the method steps implemented by the encryption and decryption platform in the embodiments above.

Alternatively, the processor system and the programmable logic device are interconnected by an AXI bus.

The embodiments of the present disclosure further disclose a security system comprising the edge port as described above, and the encryption and decryption platform as described above.

Alternatively, the edge port and the encryption and decryption platform are interconnected via a USB bus.

The term "one embodiment", "embodiment" or "one or more embodiments" herein means that the specific features, structures or characteristics described in conjunction with embodiments are included in at least one embodiment of the present disclosure. Further, note that the phrase "in one embodiment" herein does not necessarily refer to the same embodiment.

A number of specific details are explained in the instructions provided here. However, it is understood that embodiments of the present disclosure may be practiced without these specific details. In some instances, well-known methods, structures and techniques are not shown in detail so as not to obscure the understanding of this specification.

In the claims, any reference symbols located between the parentheses should not be constructed as a limitation on the claims. The word "contains" does not exclude the existence of components or steps that are not listed in the claims. The word "one" or "one" before the component does not exclude the existence of more than one such component. The present disclosure may be implemented by means of hardware comprising a number of different elements and by means of a properly programmed computer. In the unit claims of the enumerated devices, several of these devices may be embodied by the same hardware item. The use of the words first, second, and third does not indicate any order. These words can be interpreted as names.

Finally, it should be noted that the above embodiments are only used to illustrate the technical solution of the present disclosure, and are not limited thereto. Although the present disclosure is described in detail with reference to the foregoing embodiments, those of ordinary skill in the art should understand: they may still modify the technical solutions described in each of the foregoing embodiments, or equivalently replace some of the technical features. And these modifications or replacements do not depart the essence of the corresponding technical solutions from the spirit and scope of the technical solutions of each embodiment of the present disclosure.

The invention claimed is:

1. A method of encryption and decryption initialization configuration, wherein the method is applied to an edge port in a security system, the security system further comprises an encryption and decryption platform, the edge port is communication connected to the encryption and decryption platform, and the method comprises:

generating a public key and a private key corresponding to a first encryption and decryption algorithm, wherein the first encryption and decryption algorithm is an asymmetric encryption and decryption algorithm;

transmitting the public key to the encryption and decryption platform after the encryption and decryption platform is power-on;

generating key-related data corresponding to a second encryption and decryption algorithm, wherein the key-related data at least comprises a key corresponding to the second encryption and decryption algorithm, and the second encryption and decryption algorithm is a symmetric encryption and decryption algorithm;

encrypting the key-related data according to the private key by encryption using the first encryption and decryption algorithm, to obtain a key-related data cipher text; and transmitting the key-related data cipher text to the encryption and decryption platform, so that the encryption and decryption platform decrypts the key-related data cipher text according to the public key by decryption using the first encryption and decryption algorithm to obtain the key-related data, and complete initialization configuration, wherein the encryption and decryption platform comprises a processor system and a programmable logic device, and the encryption and decryption platform can send a request to the edge port via the processing system, and receive public key data transmitted by the edge port via the processing system, wherein the public key comprises a modulus and a power, and the transmitting of the public key to the encryption and decryption platform after the encryption and decryption platform is power-on comprises:

transmitting the modulus to the encryption and decryption platform when a modulus transmission request transmitted by the encryption and decryption platform is received, wherein the modulus transmission request is transmitted after the encryption and decryption platform is power-on; and transmitting the power to the encryption and decryption platform when a power transmission request transmitted by the encryption and decryption platform is received, wherein the power transmission request is transmitted after the encryption and decryption platform is power-on, and wherein the method further comprises:

receiving, by the processor system, the modulus transmitted by the edge port;

receiving, by the processor system, the power transmitted by the edge port;

calculating and obtaining, by the processor system, target parameters required to perform encryption and decryption via the public key according to the modulus; and transmitting, by the processor system, the modulus, the power, and the target parameters to the programmable logic device for storage.

2. The method according to claim 1, wherein communication between the edge port and the encryption and decryption platform is performed in a request-response manner based on a custom communication protocol.

3. The method according to claim 2, wherein the key-related data further comprises initial parameters required for encryption and decryption by the key, and the key-related data cipher text comprises a key cipher text corresponding to the key and an initial parameter cipher text corresponding to the initial parameters;

the transmitting the key-related data cipher text to the encryption and decryption platform comprises:

transmitting the key cipher text to the encryption and decryption platform when a key cipher text transmission request transmitted by the encryption and decryption platform is received; and transmitting the initial parameter cipher text to the encryption and decryption platform when an initial parameter cipher text transmission request transmitted by the encryption and decryption platform is received.

4. An edge port, wherein the edge port comprises a processor, a memory and a program stored on the memory and executable on the processor, when the program is executed, implements the operations of the method of encryption and decryption initialization configuration according to claim 1.

5. The edge port according to claim 4, wherein communication between the edge port and the encryption and decryption platform is performed in a request-response manner based on a custom communication protocol.

6. A method of encryption and decryption initialization configuration, wherein the method is applied to an encryption and decryption platform in a security system, the security system further comprises an edge port communication connected to the encryption and decryption platform, and the method comprises:

receiving a public key corresponding to a first encryption and decryption algorithm transmitted by the edge port after the encryption and decryption platform is power-on; wherein the public key is generated by the edge port, and the edge port further generates a private key corresponding to the first encryption and decryption algorithm which is an asymmetric encryption and decryption algorithm;

receiving a key-related data cipher text transmitted by the edge port; wherein the key-related data cipher text is obtained by encrypting the key-related data according to the private key by encryption using the first encryption and decryption algorithm, and the key-related data corresponding to a second encryption and decryption algorithm is generated by the edge port; and decrypting the key-related data cipher text according to the public key by decryption using the first encryption and decryption algorithm, to obtain the key-related data, and complete initialization configuration, wherein the public key comprises a modulus and a power, and the receiving of the public key corresponding to a first encryption and decryption algorithm transmitted by the edge port after the encryption and decryption platform is power-on comprises:

transmitting a modulus transmission request to the edge port after the encryption and decryption platform is power-on;

receiving the modulus transmitted by the edge port;

transmitting a power transmission request to the edge port after the encryption and decryption platform is power-on; and receiving the power transmitted by the edge port.

7. The method according to claim 6, wherein the key-related data further comprises initial parameters required for encryption and decryption by the key, and the key-related data cipher text comprises a key cipher text corresponding to the key and an initial parameter cipher text corresponding to the initial parameters;

the receiving a key-related data cipher text transmitted by the edge port comprises:

transmitting a key cipher text transmission request to the edge port;

receiving the key cipher text transmitted by the edge port;

transmitting an initial parameter cipher text transmission request to the edge port after the encryption and decryption platform is power-on;

receiving the initial parameter cipher text transmitted by the edge port.

8. The method according to claim 7, wherein the encryption and decryption platform comprises a processor system and a programmable logic device;

the receiving the key cipher text transmitted by the edge port comprises:

receiving, by the processor system, the key cipher text transmitted by the edge port;

the decrypting the key-related data cipher text according to the public key by decryption using the first encryption and decryption algorithm to obtain the key-related data, and complete initialization configuration comprises:

writing, by the processor system, a decryption instruction of the key cipher text into a configuration register of the programmable logic device;

transmitting, by the processor system, the key cipher text to the programmable logic device;

executing, by the programmable logic device, a step of decrypting the key cipher text according to the public key by decryption using the first encryption and decryption algorithm according to the decryption instruction of the key cipher text in the configuration register, to obtain the key;

transmitting, by the programmable logic device, the key to the processor system;

writing, by the processor system, a data type of the key into the configuration register of the programmable logic device;

transmitting, by the processor system, the key to the programmable logic device; and storing, by the programmable logic device, the key in a fourth storage area according to the data type of the key in the configuration register.

9. The method according to claim 8, wherein the receiving the initial parameter cipher text transmitted by the edge port comprises:

receiving, by the processor system, the initial parameter cipher text transmitted by the edge port;

the decrypting the key-related data cipher text according to the public key by decryption using the first encryption and decryption algorithm to obtain the key-related data, and complete initialization configuration further comprises:

writing, by the processor system, a decryption instruction of the initial parameter cipher text into the configuration register of the programmable logic device;

transmitting, by the processor system, the initial parameter cipher text to the programmable logic device;

executing, by the programmable logic device, a step of decrypting the initial parameter cipher text according to the public key by decryption using the first encryption and decryption algorithm according to the decryption instruction of the initial parameter cipher text in the configuration register, to obtain the initial parameter;

transmitting, by the programmable logic device, the initial parameter to the processor system;

writing, by the processor system, a data type of the initial parameter to the configuration register of the programmable logic device;

transmitting, by the processor system, the initial parameter to the programmable logic device; and storing, by the programmable logic device, the initial parameter in a fifth storage area according to the data type of the initial parameter in the configuration register.

10. The method according to claim 6, wherein the transmitting, by the processor system, the modulus, the power, and the target parameters to the programmable logic device for storage comprises:

writing, by the processor system, a data type of the modulus into a configuration register of the programmable logic device;

transmitting, by the processor system, the modulus to the programmable logic device;

storing, by the programmable logic device, the modulus in a first storage area according to the data type of the modulus in the configuration register; writing, by the processor system, a data type of the power into the configuration register of the programmable logic device;

transmitting, by the processor system, the power to the programmable logic device;

storing, by the programmable logic device, the power in a second storage area according to the data type of the power in the configuration register.

11. The method according to claim 10, wherein a quantity of the target parameters is at least one, the transmitting, by the processor system, the modulus, power, and target parameters to the programmable logic device for storage further comprises:

performing following operations for each target parameter in turn:

writing, by the processor system, a data type of the target parameter to the configuration register of the programmable logic device;

transmitting, by the processor system, the target parameter to the programmable logic device;

storing, by the programmable logic device, the target parameter in a third storage area according to the data type of the target parameter in the configuration register;

wherein the data types of the target parameters are different, and the third storage areas corresponding to the target parameters are different.

12. An encryption and decryption platform, wherein the encryption and decryption platform comprises a processor system, a programmable logic device and a program stored on a memory and executable on the processor system and the programmable logic device, when the program is executed, implements the operations of the method of encryption and decryption initialization configuration according to claim 6.

13. The encryption and decryption platform according to claim 12, wherein the processor system and the programmable logic device are interconnected by an AXI bus.

14. The encryption and decryption platform according to claim 12, wherein communication between the edge port and the encryption and decryption platform is performed in a request-response manner based on a custom communication protocol.

15. A method of encryption and decryption initialization configuration, wherein the method is applied to a security system, the security system comprises an edge port and an encryption and decryption platform, the edge port is communication connected to the encryption and decryption platform, and the method comprises:

generating, by the edge port, a public key and a private key corresponding to a first encryption and decryption algorithm, wherein the first encryption and decryption algorithm is an asymmetric encryption and decryption algorithm;

transmitting, by the edge port, the public key to the encryption and decryption platform after the encryption and decryption platform is power-on;

receiving, by the encryption and decryption platform, the public key transmitted by the edge port after the encryption and decryption platform is power-on;

generating, by the edge port, key-related data corresponding to a second encryption and decryption algorithm, wherein the key-related data at least comprises a key corresponding to the second encryption and decryption algorithm, and the second encryption and decryption algorithm is a symmetric encryption and decryption algorithm;

encrypting, by the edge port, the key-related data according to the private key by encryption using the first encryption and decryption algorithm to obtain a key-related data cipher text; and transmitting, by the edge port, the key-related data cipher text to the encryption and decryption platform;

receiving, by the encryption and decryption platform, the key-related data cipher text transmitted by the edge port; and decrypting, by the encryption and decryption platform, the key-related data cipher text according to the public key by decryption using the first encryption and decryption algorithm to obtain the key-related data, and complete initialization configuration, wherein the encryption and decryption platform comprises a processor system and a programmable logic device, and the encryption and decryption platform can send a request to the edge port via the processing system, and receive public key data transmitted by the edge port via the processing system, wherein the public key comprises a modulus and a power, and the transmitting of the public key to the encryption and decryption platform after the encryption and decryption platform is power-on comprises:

transmitting the modulus to the encryption and decryption platform when a modulus transmission request transmitted by the encryption and decryption platform is received, wherein the modulus transmission request is transmitted after the encryption and decryption platform is power-on; and transmitting the power to the encryption and decryption platform when a power transmission request transmitted by the encryption and decryption platform is received, wherein the power transmission request is transmitted after the encryption and decryption platform is power-on, and wherein the method further comprises:

receiving, by the processor system, the modulus transmitted by the edge port;

receiving, by the processor system, the power transmitted by the edge port;

calculating and obtaining, by the processor system, target parameters required to perform encryption and decryption via the public key according to the modulus; and transmitting, by the processor system, the modulus, the power, and the target parameters to the programmable logic device for storage.

16. A security system, comprising an edge port and an encryption and decryption platform, wherein the security system comprises a processor, a memory and a program stored on the memory and executable on the processor, when the program is executed, causes the processor to implement the operations of the method of encryption and decryption initialization configuration according to claim 15.

17. The security system according to claim 16, wherein the edge port and the encryption and decryption platform are interconnected by a USB bus.

\*    \*    \*    \*    \*